(12) United States Patent
Kuno et al.

(10) Patent No.: US 8,043,764 B2
(45) Date of Patent: Oct. 25, 2011

(54) STACK STRUCTURE OF SOLID OXIDE FUEL CELL APPARATUS

(75) Inventors: Toshiaki Kuno, Nagoya (JP); Takenori Ichigi, Konan (JP); Keiichi Kanno, Nagoya (JP); Makoto Ohmori, Nagoya (JP); Masayuki Shinkai, Ama-Gun (JP); Genta Terazawa, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 32 days.

(21) Appl. No.: 12/693,636

(22) Filed: Jan. 26, 2010

(65) Prior Publication Data
US 2010/0190090 A1 Jul. 29, 2010

(30) Foreign Application Priority Data

Jan. 28, 2009 (JP) ................... 2009-016840
Dec. 9, 2009 (JP) ................... 2009-279550

(51) Int. Cl.
*H01M 8/24* (2006.01)
(52) U.S. Cl. .................. 429/495; 429/496; 429/510
(58) Field of Classification Search .......... 429/495
See application file for complete search history.

(56) References Cited

U.S. PATENT DOCUMENTS

| 5,750,281 A | 5/1998 | Washington et al. |
| 2003/0235745 A1 | 12/2003 | Mook et al. |
| 2006/0172167 A1* | 8/2006 | Herman et al. .......... 429/30 |
| 2007/0231664 A1 | 10/2007 | Zerfass et al. |
| 2008/0044713 A1* | 2/2008 | Fritz et al. .......... 429/36 |
| 2008/0206618 A1 | 8/2008 | Ichigi et al. |
| 2010/0003579 A1 | 1/2010 | Okamoto et al. |

FOREIGN PATENT DOCUMENTS

| EP | 2 133 951 A1 | 12/2009 |
| JP | 2009-146805 A1 | 7/2009 |
| WO | 2006/060247 A2 | 6/2006 |
| WO | 2007/029860 A1 | 3/2007 |
| WO | 2008/123570 A1 | 10/2008 |

OTHER PUBLICATIONS

O.T. Ryu et al., "*Electricity-Generating Characteristics of Flow-Channel-Incorporated Cell Stack*," Proceedings of the 15th SOFC Research Meetings, The SOFC Research Institute, Dec. 5, 2006, pp. 212-215.

* cited by examiner

*Primary Examiner* — John S Maples
(74) *Attorney, Agent, or Firm* — Burr & Brown

(57) ABSTRACT

A stack structure includes plate-like electrochemical cells of ceramic, each having a pair of main surfaces and a side surface, and plate-like retainer pieces. The cell includes a first electrode in contact with first gas, a solid electrolyte, and a second electrode in contact with second gas. The first electrode has a gas flow channel formed therein and adapted to allow flow of the first gas. The cell has gas inflow and outflow ports. The retainer piece includes a body portion having a through-hole formed therein, and a pair of protrusions protruding from the body portion. The retainer piece has a communication hole formed therein and adapted to establish communication between the through-hole and a space formed between the protrusions. The cell is held by the paired protrusions, thereby establishing communication between the gas inflow or outflow port of the cell and the communication hole of the retainer piece.

5 Claims, 40 Drawing Sheets

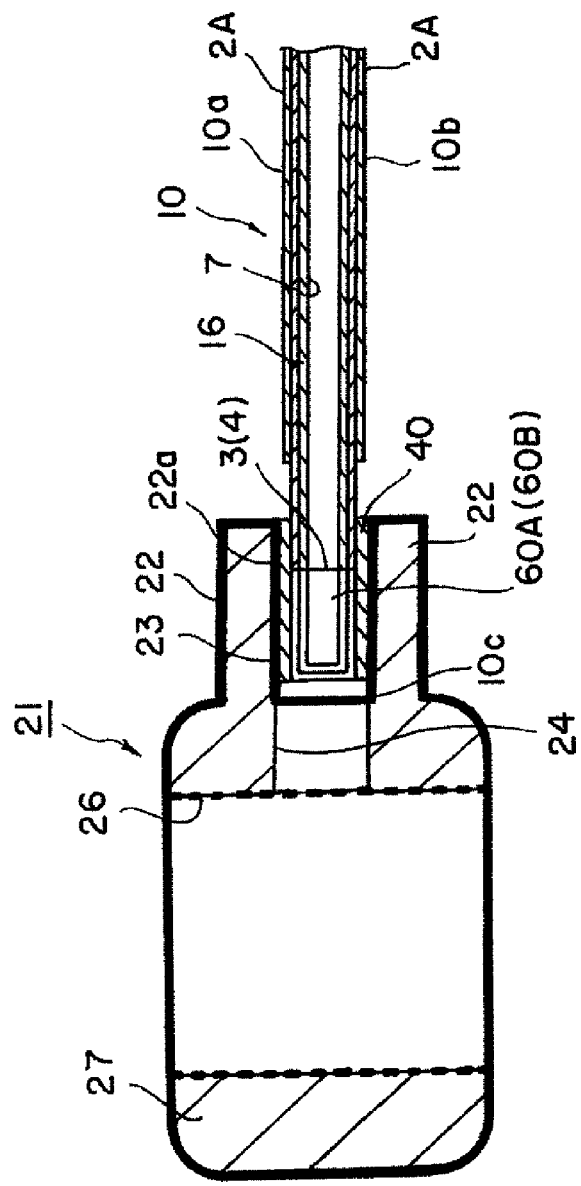

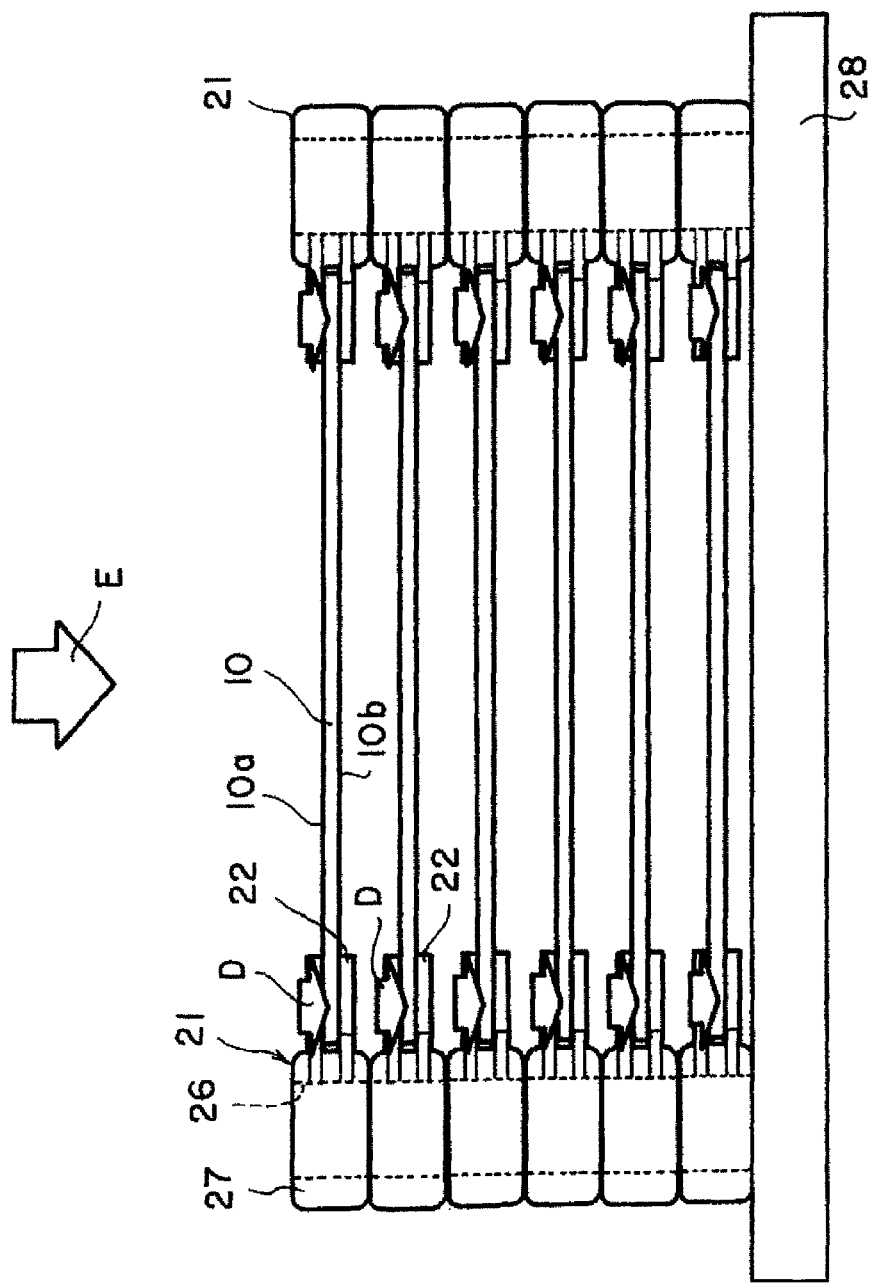

__US 8,043,764 B2__

STACK STRUCTURE OF SOLID OXIDE FUEL CELL APPARATUS

This application claims priority from both Japanese No. 2009-016840, filed 28 Jan. 2009, and Japanese No. 2009-279550, filed 9 Dec. 2009.

BACKGROUND OF THE INVENTION

1. Field of the Invention

The present invention relates to an electrochemical apparatus, such as a solid oxide fuel cell apparatus.

2. Description of the Related Art

Since a single fuel cell generates a voltage of about 1 V, in order to generate large output, a plurality of fuel cells must be stacked. In this connection, difficulty is encountered in ensuring a stable stack structure while increasing the number of stacked cells for generating large output.

According to WO2007/029860 A1, particularly FIG. 14 therein, an electrochemical cell made of ceramic is configured such that a fuel flow channel is formed within a fuel electrode, and a solid electrolyte membrane and an air electrode membrane are formed on the fuel electrode. Gas supply holes and gas discharge holes are formed in the cell, and a plurality of the cells are stacked directly on one another, thereby forming a stack. In formation of the stack, the gas supply holes of the adjacent cells are connected to each another to form gas supply channels, whereas the gas discharge holes of the adjacent cells are connected to one another to form gas discharge channels.

According to the stack (a set of stacked cells) described in WO2007/029860 A1, the cells each having a gas flow channel are attached to respective fixing members, and the resultant assemblies are stacked. Since the cells of the stack structure also serve as structural members, stress is apt to be imposed thereon. Particularly, the cell having the gas flow channel therein is weaker in structural strength than a cell having no gas flow channel therein; thus, a stack structure is desirably such that stress is not imposed on the cells.

The applicant of the present invention has disclosed, in PCT JP2008/056636 and "Electricity-generating characteristics of flow-channel-incorporated cell stack," Proceedings of The 15th SOFC Research Meetings, The SOFC Research Institute, Dec. 5, 2006, pp. 212-215, a stack structure in which an electrochemical cell has a fuel gas flow channel formed therein, and a plurality of the electrochemical cells are supported by gas supply members and gas discharge members while being spaced apart from each other. The flat cells are stacked in such a manner that each of ring-shaped connection members intervenes between the adjacent cells, so that the connection members and the cells are alternatingly arranged in layers, thereby forming a fuel gas or oxidizing gas flow channel.

Also, the applicant of the present invention has disclosed, in Japanese Patent Application No. 2007-324508, a stack in which a plurality of interconnectors are stacked such that the interconnectors accommodate respective flow-channel-incorporated cells. An electrically conductive portion is formed on the surface of each of the cells, and the electrical conductive portions of the cells are electrically connected in series to the respectively adjacent interconnectors. The flat cells are stacked in such a manner that each of ring-shaped connection members intervenes between the adjacent cells, so that the connection members and the cells are alternatingly arranged in layers, thereby forming a fuel gas or oxidizing gas flow channel.

However, when a stack composed of a large number of stacked cells is operated at a high temperature of, for example, 800° C., in some cases, the cracking of some cells has been experienced, with a resultant drop in output per unit volume. Conceivably, this is for the following reason: when a cell is warped or deformed, excessive stress is imposed on some cells, particularly those located in a lower region of the stack; as a result, fine cracking or separation of the cells arises, thereby causing leakage of gas, which leads to a drop in output of generated electricity. Additionally, since the warpage of a cell causes a failure to hold the horizontality of the upper and lower surfaces of the associated connection member, there has been involved a problem of failure to hold a constant cell-to-cell distance.

SUMMARY OF THE INVENTION

An object of the present invention is to provide a stack structure of electrochemical cells made of ceramic, particularly, a stack structure of cells of a solid oxide fuel cell apparatus, which exhibits, in the course of operation, a low rate of occurrence of gas leakage stemming from warpage or deformation of a cell(s) and a small variation among cell-to-cell distances through maintenance of horizontality of connection members.

A stack structure of a solid oxide fuel cell apparatus according to the present invention comprises a plurality of solid oxide fuel cells and a retainer member. Each of the cells assumes the form of plate; has a pair of upper and lower main surfaces, and a side surface; and comprises a fuel-side electrode having an inner flow channel for fuel gas formed therein and being in contact with the fuel gas, a solid electrolyte, and an oxygen-side electrode being in contact with oxygen-containing gas. The retainer member is adapted to retain the plurality of cells in such a manner that two adjacent ones of the cells are vertically spaced apart from each other. The retainer member has a fuel supply channel for externally supplying the fuel gas to the inner flow channels of the cells. Spaces each formed between two adjacent ones of the cells serve as flow channels for the oxygen-containing gas.

The side surface of each of the cells has an inflow port into which the fuel gas flows from the fuel supply channel, and an outflow port from which the fuel gas flows out. The retainer member comprises a plurality of retainer pieces for retaining the respective cells. Each of the retainer pieces comprises a body portion having a through-hole extending vertically therethrough and a pair of protrusions protruding horizontally from the body portion and facing each other while being spaced vertically apart from each other, and has a communication hole formed therein for establishing communication between the through-hole and a space formed between the paired protrusions.

A portion of an outer peripheral portion of each of the cells which corresponds to the inflow port is held between the paired protrusions of the retainer piece via a seal material, thereby isolating the inflow port from the outside of the stack structure and establishing communication between the inflow port and the communication hole. Additionally, the plurality of retainer pieces are vertically stacked, thereby vertically establishing communication among a plurality of the through-holes and thus forming the fuel supply channel extending vertically. The fuel supply channel is located externally of the cells as viewed from a vertical direction.

According to a method of forming a gas supply channel and a gas discharge channel through alternating stacking of cells and connection members (see, for example, FIGS. 7 and 32), loads of all cells located above a certain cell are cumulatively imposed on the certain cell. Accordingly, the lower the level of a cell, the greater a cumulative load imposed on the cell. Particularly, when a cell is warped, the warpage of the cell directly affects the vertically adjacent cells via associated connection members. That is, the upper and lower surfaces of the connection member are inclined from the horizontal. The inclination causes the imposition of a nonuniform load on the associated cell. Further, the lower the level of a cell, the greater the degree of the nonuniformity. Accordingly, the lower the level of a cell, the higher the rate of occurrence of cracking of the cell and separation at a bond surface (the bond surface between the cell and the associated connection member).

By contrast, according to the present invention, the retainer member, which is a stack of the retainer pieces, bears a load of the cells, and each of the cells is retained by means of the paired protrusions of the corresponding retainer piece. Additionally, adjacent cells are spaced apart from each other. Meanwhile, the fuel supply channel (and the fuel discharge channel) of the entire stack is formed in the retainer member (at the outside of the cells). Accordingly, in a state in which a large number of cells are stacked, loads of the cells located above a certain level of the stack are not imposed on the cells located below the level. As a result, the rate of occurrence of cracking of the cell lowers. Accordingly, the rate of occurrence of gas leakage stemming from warpage or deformation of the cell lowers.

Particularly, since the cell is retained by means of the paired protrusions of the retainer piece, even when the cell is warped, the horizontality of the upper and lower surfaces of the retainer piece can be ensured. Thus, the cell-to-cell distance can be determined through the thickness of the retainer piece. The warpage of some cells is less likely to affect the entire stack, whereby variation among cell-to-cell distances can be lowered. In this manner, according to the present invention, loads of all cells located above a certain cell are not cumulatively imposed on the certain cell. Additionally, even when the cell(s) is warped, the rate of occurrence of gas leakage can be greatly lowered. Further, since the horizontality of the upper and lower surfaces of the retainer piece can be ensured, variation among cell-to-cell distances can be lowered.

Also, according to the present invention, the retainer member is divided into a plurality of retainer pieces corresponding to the individual cells. Accordingly, the stack structure can be fabricated in such a manner that, after the retainer pieces are attached to the corresponding cells, the resultant cells to which the retainer pieces are attached are stacked. As a result, before fabrication of the stack structure, the cells to which the retainer pieces are attached can be individually tested for leakage of gas (gas leak test). Accordingly, before fabrication of the stack structure, a cell(s) which suffers gas leakage (defective cell) can be found, and the defective cell(s) can be replaced beforehand with a cell(s) free from gas leakage (nondefective cell(s)).

By contrast, in the case of employment of a common integral retainer member for a plurality of cells, the plurality of cells are attached to the retainer member, whereby a stack structure can be fabricated. In this case, the gas leak test cannot be conducted before fabrication of the stack structure. In other words, before fabrication of the stack structure, a defective cell(s) cannot be found; accordingly, the defective cell(s), if any, cannot be replaced with a nondefective cell(s). Thus, as compared with the case of employment of a common integral retainer member for a plurality of cells, the employment of the stack structure according to the present invention facilitates the execution of the gas leak test as well as the replacement of a defective cell(s) with a nondefective cell(s).

Preferably, in the stack structure of a solid oxide fuel cell apparatus according to the present invention, the ratio ($H2-H1$)/L (see FIG. 27) is 0.001 to 0.5 inclusive, where $H1$ is the thickness of the outer peripheral portion of the cell; $H2$ is the distance between the paired protrusions spaced vertically apart from each other; and L is the protruding length of the paired protrusions protruding horizontally from the body portion.

Through employment of the above ratio, a portion of each of the cells to be held is reliably held between the paired protrusions of the retainer piece, and the portion of the cell can move freely to a certain extent in relation to the paired protrusions. Accordingly, even when a portion or all of the plurality of cells are warped, the upper and lower surfaces of a plurality of the stacked retainer pieces can be held horizontally. As a result, even when a cell(s) is warped before or after fabrication of the stack structure, the cell(s) can be reliably retained, and there can be restrained an increase in the rate of occurrence of gas leakage stemming from inclination of the upper and lower surfaces of the retainer piece from the horizontal.

Preferably, in the stack structure of a solid oxide fuel cell apparatus according to the present invention, the outline of each of the cells as viewed from a vertical direction has a first straight-line portion, and each of the retainer pieces is configured to hold a portion of the outer peripheral portion of each of the cells which corresponds partially to the first straight-line portion and corresponds to the inflow port. Through employment of this configuration, as compared with the case where each of the retainer pieces holds a portion of the outer peripheral portion of each of the cells which corresponds entirely to the first straight-line portion, the contact area between the outer peripheral portion of the cell and the protrusions of the retainer piece can be reduced. As a result, the rate of occurrence of gas leakage stemming from the warpage or deformation of the cell is lowered.

In this case, there may be employed a structure in which only a portion of the outer peripheral portion of each of the cells which corresponds to the inflow port is held by the retainer piece, whereas a portion of the outer peripheral portion of each of the cells which corresponds to the outflow port is not held by the retainer piece (i.e. a so-called cantilever structure in which the outflow port is opened at the free end of each of the cells). However, in this structure, the held portion of each of the cells is apt to receive a relatively large bending stress induced by the weight of the cell.

Therefore, preferably, in the case where the outline of each of the cells as viewed from a vertical direction has a second straight-line portion in parallel with the first straight-line portion, a portion of the outer peripheral portion of each of the cells which corresponds partially to the second straight-line portion and corresponds to the outflow port is held between the paired protrusions of the retainer piece via the seal material, thereby isolating the outflow port from the outside of the stack structure and establishing communication between the outflow port and the communication hole; the plurality of retainer pieces are vertically stacked, thereby vertically establishing communication among a plurality of the throughholes and thus forming in the retainer member a fuel discharge channel extending vertically and adapted to discharge the fuel gas from the inner flow channels of the cells to the exterior of the stack structure; and the fuel discharge channel is located externally of the cells as viewed from a vertical direction.

According to this configuration, the retainer pieces hold respective portions of the outer peripheral portion of each of the cells which correspond to the inflow port and the outflow port positioned in opposition to each other, thereby providing a both-end-support structure in which each of the cells is supported by a pair of the retainer pieces. Accordingly, a bending stress induced by the weight of each of the cells is distributed to the opposite held portions of the cell, thereby lowering a bending stress received by each of the held portions of the cell.

Preferably, in the stack structure of a solid oxide fuel cell apparatus according to the present invention, the seal material contains glass having a first softening point lower than an operating temperature of the solid oxide fuel cell apparatus. Through employment of such a seal material, in the course of operation of the solid oxide fuel cell apparatus, the seal material can be softened. As a result, while the seal material preserves its sealing function, a held portion of the cell can move in relation to the retainer piece. Accordingly, for example, in the case where the amount of deformation of the cell varies with rising temperature, various stresses which the cell receives from the retainer piece can be mitigated. As a result, the rate of occurrence of cracking of the cell is lowered; accordingly, the rate of occurrence of gas leakage stemming from the warpage or deformation of the cell can be lowered.

Preferably, in the case where the plurality of retainer pieces are vertically stacked with a seal material placed therebetween, the seal material is formed from glass having a second softening point higher than the first softening point, or from ceramic. Through employment of such a seal material, in the course of operation of the solid oxide fuel cell apparatus, the seal material is unlikely to be softened. As a result, while the seal material preserves its sealing function, the entire shape of the stack structure can be reliably maintained.

BRIEF DESCRIPTION OF THE DRAWINGS

FIG. 6 is a sectional view showing a state in which the cell 10 is held by the retainer piece 21;

FIG. 8 is a schematic view showing a stack structure of an embodiment of the present invention in which the cells 10 and the retainer pieces 21 are stacked;

FIG. 23 is a sectional perspective view of the cell 120 as cut along an x-y plane which contains line 23-23 of FIG. 21, showing a fuel electrode current-collection layer 121a;

DESCRIPTION OF THE PREFERRED EMBODIMENTS

Figure 1:
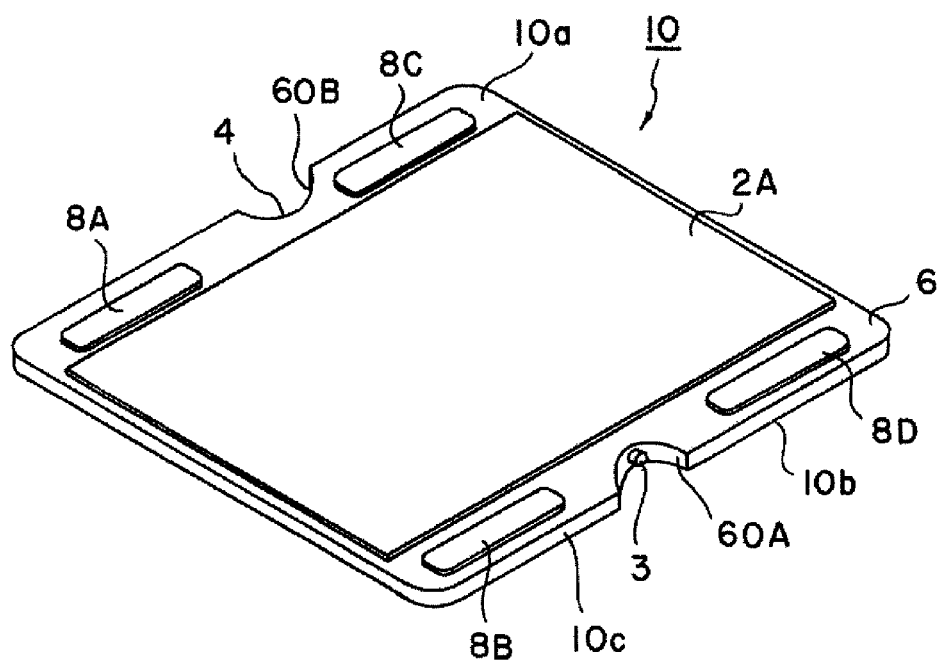
FIG. 1 is a perspective view showing an electrochemical cell 10.

In the present invention, an electrochemical cell assumes the form of a plate. However, the present invention is not limited thereto. For example, the electrochemical cell may assume the form of a curved plate or an arcuate plate. The electrochemical cell includes a first electrode which comes into contact with a first gas, a solid electrolyte, and a second electrode which comes into contact with a second gas.

Anode or cathode is selected for the first electrode or the second electrode. Specifically, one of the first electrode and the second electrode is an anode, and the other is a cathode. Similarly, oxidizing gas or reducing gas is selected for the first gas or the second gas.

No particular limitation is imposed on oxidizing gas, so long as the gas can supply oxygen ions to a solid electrolyte membrane. Examples of oxidizing gas include air, diluted air, oxygen, and diluted oxygen. Examples of reducing gas include $H_2$, CO, $CH_4$, and mixed gas thereof.

The electrochemical cell according to the present invention means a general cell which induces electrochemical reactions. For example, the electrochemical cell can be used as an oxygen pump and a high-temperature water-vapor electrolysis cell. The high-temperature water-vapor electrolysis cell can be used in a hydrogen production apparatus and a water-vapor removal apparatus. The electrochemical cell can be used as a decomposition cell for $NO_x$ and $SO_x$. The decomposition cell can be used as a purifying device for exhaust gas from an automobile and a power-generating apparatus. In this case, oxygen is removed from exhaust gas by means of passage of exhaust gas through the solid electrolyte membrane; furthermore, $NO_x$ is electrolyzed into $N_2$ and $O^{2-}$, and the thus-yielded oxygen can also be removed. In addition to this process, water vapor contained in exhaust gas is electrolyzed into hydrogen and oxygen, and the thus-yielded hydrogen reduces $NO_x$ into $N_2$. According to a preferred embodiment, the electrochemical cell serves as a fuel cell of a solid oxide fuel cell apparatus.

No particular limitation is imposed on material for the solid electrolyte, and an oxygen ion conductor of any kind can be used. For example, yttria-stabilized zirconia or yttria-partially-stabilized zirconia may be used. In the case of an $NO_x$ decomposition cell, cerium oxide is also preferred.

Material for cathode is preferably lanthanum-containing perovskite-type complex oxide, more preferably lanthanum manganite or lanthanum cobaltite, most preferably lanthanum manganite. Lanthanum cobaltite and lanthanum manganite may be doped with, for example, strontium, calcium, chromium, cobalt (in the case of lanthanum manganite), iron, nickel, or aluminum.

Material for anode is preferably, for example, nickel-magnesia spinel, nickel-nickel alumina spinel, nickel-zirconia, nickel-yttria, platinum-cerium oxide, or ruthenium-zirconia.

No particular limitation is imposed on the form of the electrochemical cell. The electrochemical cell may be composed of the following three layers: anode, cathode, and a solid electrolyte layer. Alternatively, the electrochemical cell may have, for example, a porous material layer in addition to anode, cathode, and the solid electrolyte layer.

In the present invention, the electrochemical cell has a gas flow channel formed therein in which a first gas flows, and a gas flow hole formed therein for either supply or discharge of gas therethrough. Preferably, the electrochemical cell has both a gas supply hole and a gas discharge hole. No particular limitation is imposed on the form of the gas flow channel, the number and location of the gas supply hole, and the number and location of the gas discharge hole. However, the gas supply hole and the gas discharge hole must be separated from each other.

A retainer piece includes a body portion having a through-hole formed therein, and a pair of protrusions protruding from the body portion. The retainer piece has a communication hole formed therein for establishing communication between the through-hole and a space formed between the paired protrusions. The body portion of the retainer piece does not necessarily assume the form of a flat plate, but may assume the form of a curved plate. No particular limitation is imposed on the shape of the protrusions, so long as the shape enables retaining or holding of the cell. Preferably, each of the protrusions assumes the form of a flat plate. The through-hole extends through the body portion between the paired main surfaces.

In the present invention, the paired protrusions of the retainer piece hold the electrochemical cell therebetween, whereby communication is established between the gas flow hole of the cell and the communication hole of the retainer piece. As a result, the gas flow channel of the cell communicates with the through-hole of the retainer piece. A plurality of the retainer pieces are stacked, whereby the through-holes of the retainer pieces are connected to one another, thereby forming a gas supply channel or a gas discharge channel.

According to a preferred embodiment, the cell has a recess portion formed at its side surface, and the recess portion is positioned between the paired protrusions. Through employment of such a recess portion, the contact area between the cell and the protrusions of the retainer piece can be reduced.

According to a preferred embodiment, the cell has a gas flow hole for supply of gas and a gas flow hole for discharge of gas, and the retainer pieces are attached to the cell at positions corresponding to the gas flow holes. In this case, at least two retainer pieces are attached to a single cell.

According to a preferred embodiment, a plurality of cells are provided; the retainer pieces are attached to the respective cells; a plurality of the retainer pieces are stacked; the plurality of cells are arranged while being spaced apart from one another; and the through-holes of the plurality of retainer pieces communicate with one another, thereby forming a gas flow channel.

In the present invention, no particular limitation is imposed on a method of sealing the retainer piece and the electrochemical cell against each other. Preferably, for such seal or hermetic seal, a seal material of glass or ceramic, a mechanical coupling method, or a seal member is used. No particular limitation is imposed on such a seal material or member; however, the seal material or member must exhibit resistance to oxidation and resistance to reduction at an operating temperature of the electrochemical cell. Specific examples of the seal material include glass and crystallized glass which predominantly contain silica, and brazing metal. Also, examples of the seal member include O-rings, C-rings, E-rings, and compression seals, such as metal jacket gaskets and mica gaskets.

No particular limitation is imposed on a method of connecting the adjacent retainer pieces. For example, such connection can be achieved through use of a seal material of glass or ceramic, or a mechanical coupling method. Also, no particular limitation is imposed on a method of hermetic seal for the connection. However, use of the above-mentioned seal material is preferred.

No particular limitation is imposed on material for the retainer piece, so long as the material has mechanical strength higher than that of ceramic used to form the cell. Preferably, the material differs from the cell in thermal expansion coefficient by $2 \times 10^{-6}$/K or less. Examples of such material include zirconia, magnesia, spinel ceramics, and a composite material thereof. The material may be metal, so long as the metal exhibits resistance to oxidation and resistance to reduction at an operating temperature of the electrochemical cell. The metal may be pure metal or an alloy. Nickel; a nickel-based alloy, such as INCONEL or NICHROME; an iron-based alloy, such as stainless steel; and a cobalt-based alloy, such as STELLITE, are preferred.

The present invention will next be described in more details with reference to the drawings as appropriate.

Figure 2:
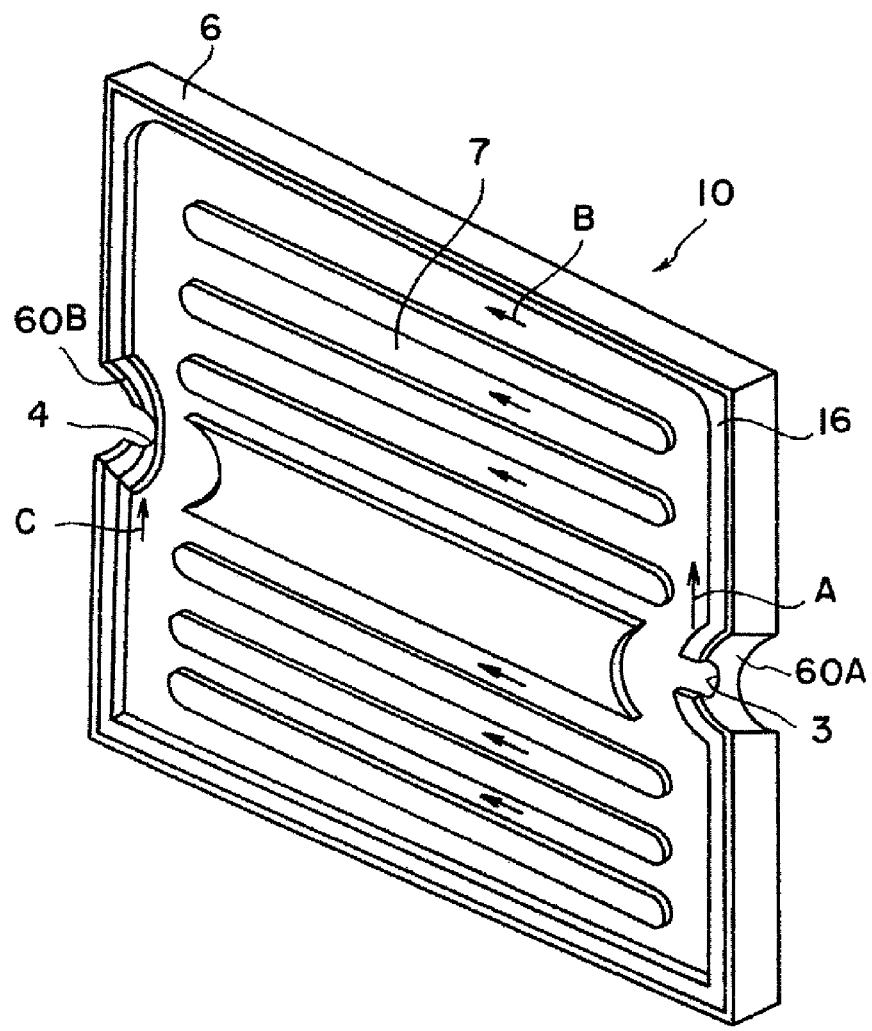
FIG. 2 is a cutaway perspective view showing the interior of the cell 10.
Figure 3:
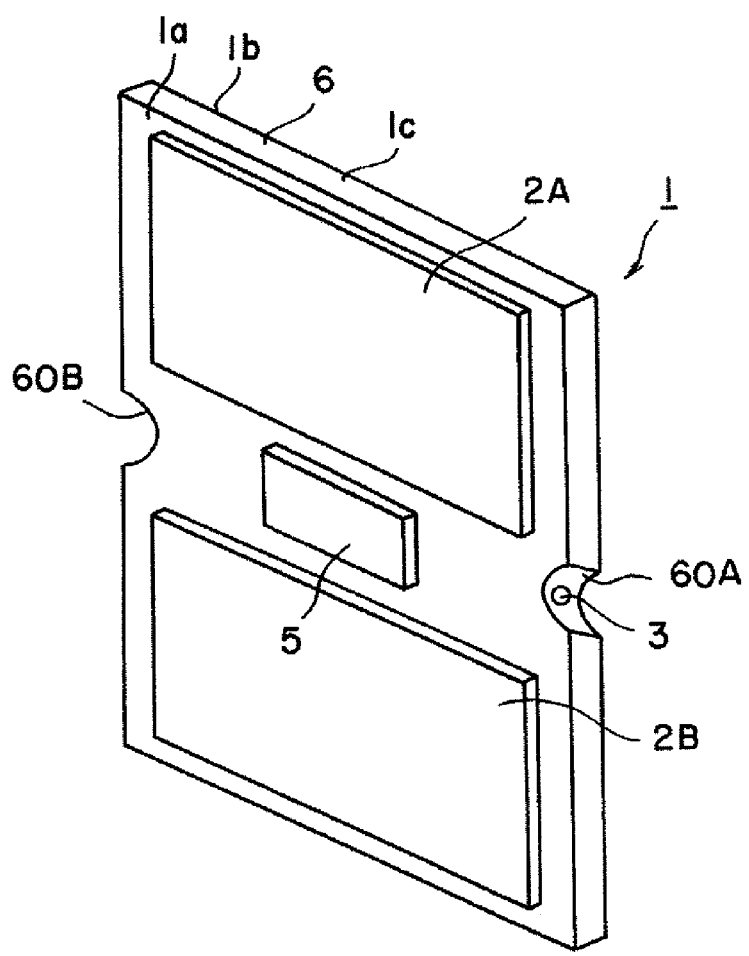
FIG. 3 is a perspective view showing an electrochemical cell 1 according to another embodiment of the present invention.

FIG. 1 is a perspective view showing an electrochemical cell 10 according to an embodiment of the present invention, and FIG. 2 is an exploded perspective view showing the electrochemical cell 10. FIG. 3 is a perspective view showing a cell 1 according to another embodiment of the present invention.

A first electrode 16 of the electrochemical cell 10 has a gas flow channel 7 formed therein for allowing flow of a first gas. The first electrode 16 assumes the form of a flat plate. A solid electrolyte layer 6 is provided in such a manner as to cover the first electrode 16. A second electrode 2A is formed on each of main surfaces 10a and 10b located on the opposite sides of the cell 10, and the second electrodes 2A are exposed.

A side surface 10c of the electrochemical cell 10 of FIG. 1 has recess portions 60A and 60B at predetermined positions. The recess portions 60A and 60B have respective communication holes 3 and 4 formed therein. The communication hole 3 serves as a gas supply hole, and the communication hole 4 serves as a gas discharge hole. As shown in FIG. 2, the first gas flows into the cell 10 through the gas supply hole 3; flows in the gas flow channel 7 as indicated by arrows A, B, and C; and flows out from the discharge hole 4. In the course of flowing in the flow channel 7, the first gas contributes to electrochemical reactions. In the embodiment of FIG. 1, four conductive portions 8A, 8B, 8C, and 8D are provided on an outer peripheral portion of the main surface 10a of the cell 10.

In FIG. 3, the second electrodes 2A and 2B are formed on main surfaces 1a and 1b, respectively, located on the opposite sides of the cell 1, and the second electrodes 2A and 2B are exposed. A side surface 1c of the cell 1 has the recess portions 60A and 60B at predetermined positions. The recess portions 60A and 60B have the respective communication holes 3 and 4 formed therein. A conductive portion 5 is exposed at a central portion of the cell 1 and electrically communicates with the first electrode 16 located in the interior of the cell 1.

According to a preferred embodiment, for example, as shown in FIG. 1, a plurality of conductive portions are provided on an outer peripheral portion of a main surface of a cell. The main surface of the cell means a surface of the cell having large area, and usually the cell has two main surfaces located opposite each other. The outer peripheral portion of the main surface means a region extending within 10 mm inward from the outer edge of the main surface. The conductive portion of the present invention is not necessarily entirely encompassed within the outer peripheral portion, but may be partially encompassed within the outer peripheral portion.

According to the present embodiment, the number of the conductive portions per cell is two or more. However, the number of the conductive portions per cell is preferably three or more, more preferably four or more. No upper limit is imposed on the number of the conductive portions; however, eight or fewer is practical.

Figure 4A:
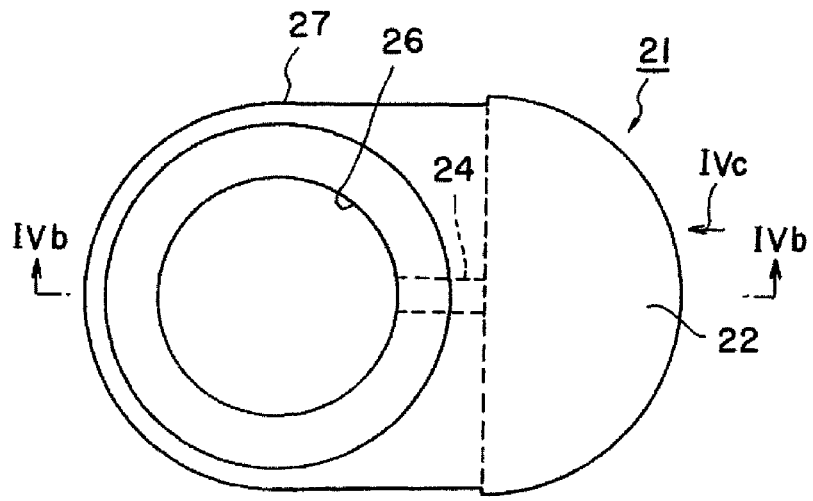
FIG. 4A is a plan view showing a retainer piece 21.
Figure 4B:
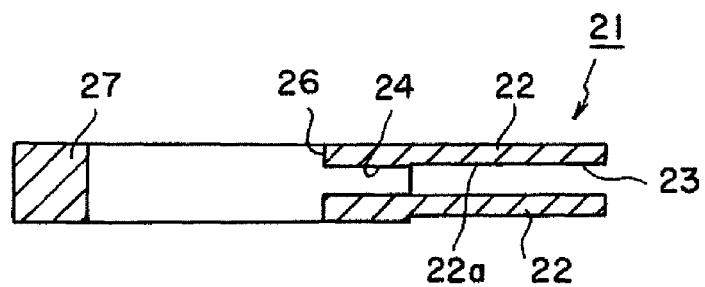
FIG. 4B is a sectional view of the retainer piece 21 taken along line IVb-IVb of FIG. 4A.
Figure 4C:
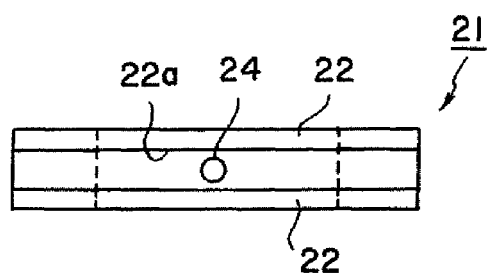
FIG. 4C is a front view of the retainer piece 21 as viewed from the direction of arrow IVc of FIG. 4A.

FIG. 4A is a plan view showing a retainer piece 21 usable in the present invention; FIG. 4B is a sectional view of the retainer piece 21 taken along line IVb-IVb of FIG. 4A; and FIG. 4C is a front view of the retainer piece 21 as viewed from the direction of arrow IVc of FIG. 4A.

The retainer piece 21 is composed of a body portion 27 having the form of a flat plate, and a pair of protrusions 22 protruding from the body portion 27. The body portion 27 has a through-hole 26 extending therethrough between the paired main surfaces. Each of the protrusions 22 assumes the form of a flat plate and is fan-shaped as viewed in plane. A space 23 is formed between the protrusions 22, and retaining surfaces 22a face the space 23. The space 23 communicates with the through-hole 26 via a communication hole 24.

Figure 5A:
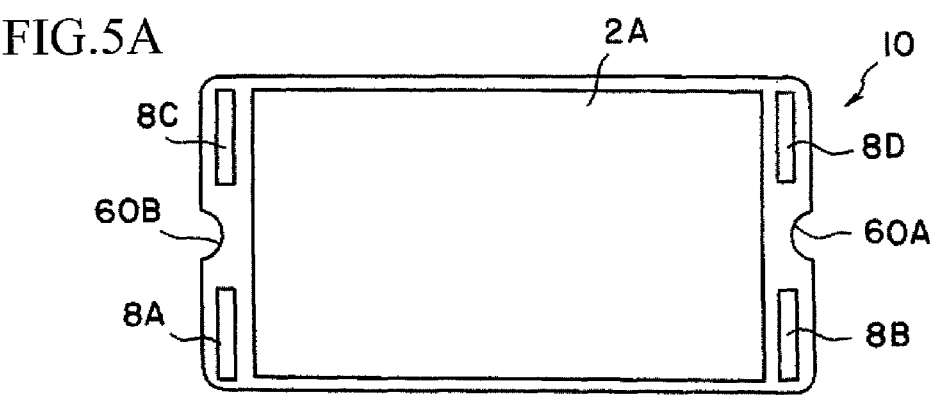
FIG. 5A is a plan view of the electrochemical cell 10.

The retainer pieces 21 are attached to the cell 10 (1) for retaining the cell 10 (1). For example, FIG. 5A shows the cell 10 as viewed in plane. In this state, a pair of the recess portions 60A and 60B are located at two mutually facing sides of the cell 10, and face each other. Next, as shown in FIG. 5B, the retainer pieces 21 are attached to the cell 10 in such a manner as to cover the respective recess portions 60A and 60B.

Figure 5B:
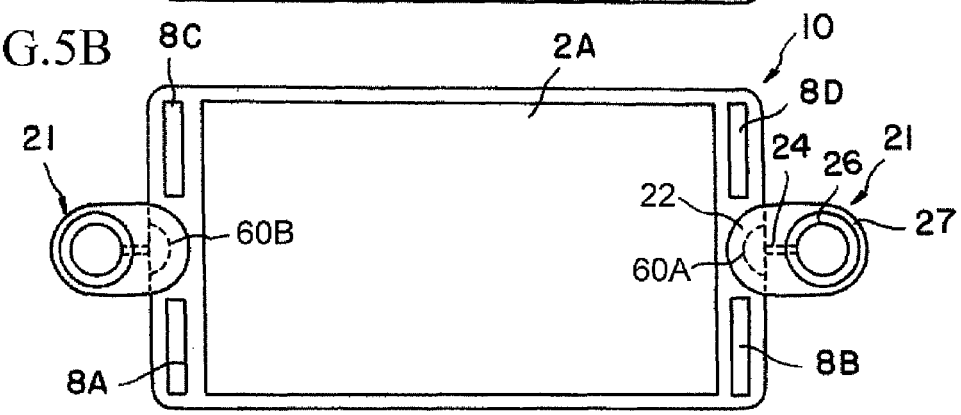
FIG. 5B is a plan view showing a state in which the retainer pieces 21 are attached to the cell 10.

In this state, as shown in FIG. 5B and FIG. 6, an edge region of the cell 10 around the recess portion 60A (60B) is held between the paired protrusions 22. The recess portions 60A and 60B enter the respective spaces 23. A bonding material 40 intervenes between the retaining surfaces 22a of the protrusions 22 and the corresponding main surfaces 10a and 10b of the cell 10, thereby hermetically sealing the cell 10 and the retainer piece 21 against each other. In this state, the gas flow channel 7 within the cell 10 communicates with the through-hole 26 via the space 23 and the communication hole 24.

Figure 7:
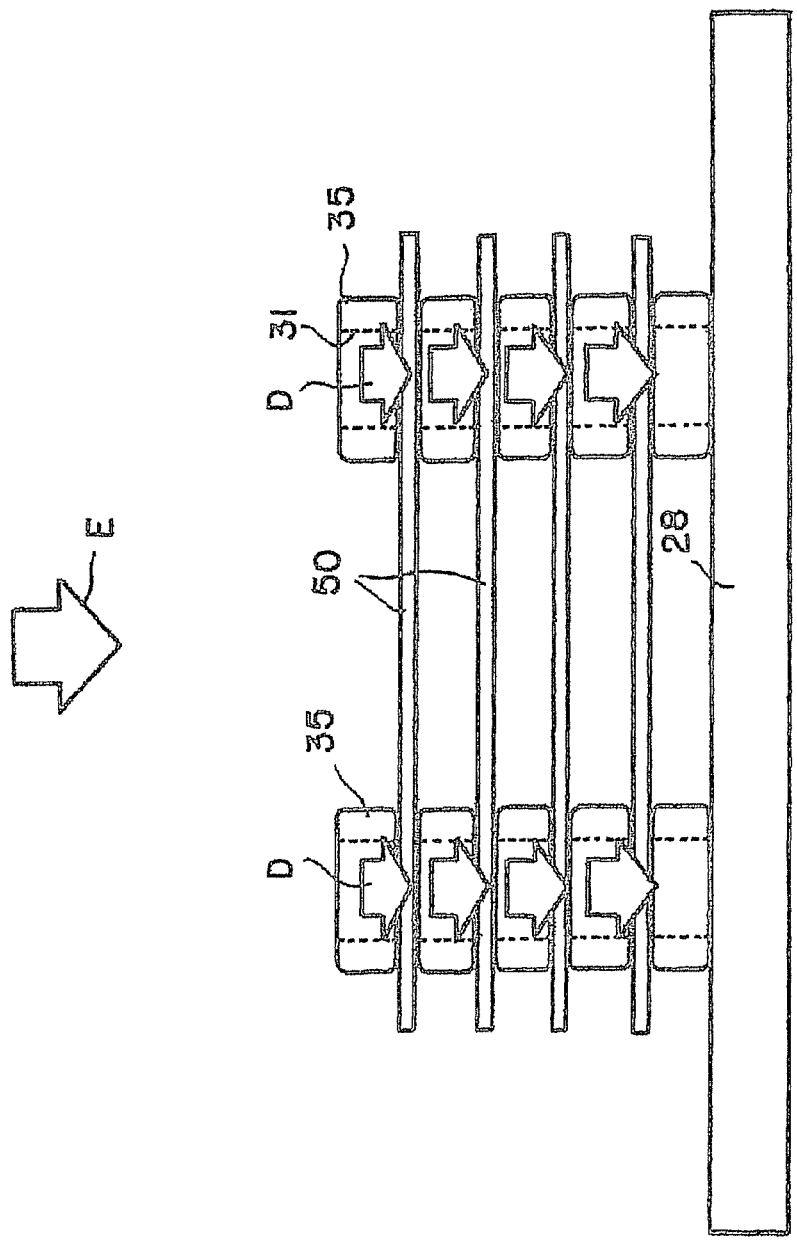
FIG. 7 is a schematic view showing a conventional stack structure in which cells 50 and connection members 35 are alternatingly stacked.

Meanwhile, suppose that cells 50 and the cells 10 are stacked respectively as shown in FIGS. 7 and 8. The thus-formed stacks are placed on respective beds 28, followed by application of pressure along the direction of arrow E.

Figure 9A:
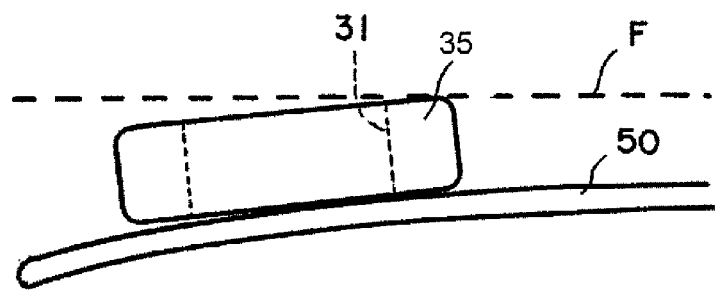
FIG. 9A is a schematic view showing the positional relation between the warped cell 50 and the connection member 35 in the stack structure of FIG. 7.

As shown in FIG. 7, the cells 50 and connection members 35 are alternatingly stacked. In this case, a gas supply/discharge channel 31 is formed in a stack of the connection members 35. In this state, stress induced by load is imposed on the cells 50 and the connection members 35 as indicated by arrows D. However, in this stacking method, large stress is apt to be locally imposed particularly on the cells 50 located near the bed 28. The own loads of the cells 50 and the connection members 35 are accumulated such that the closer the cell 50 is to the bed 28, the greater the load-induced stress imposed on the cell 50. Further, as shown in FIG. 9A, when the cell 50 is warped in such a manner as to deflect from the horizontal plane F, the connection member 35 on the cell 50 is also inclined from the horizontal surface F, and excess stress is imposed locally on the cell 50. Further, such deformation increases toward the bottom of the stack. Since the bond surface between the connection member 35 and the cell 50 fails to maintain its horizontality, even when stress weaker than the original bonding strength is imposed, the connection member 35 is apt to be separated from the cell 50 with high probability. Since load is accumulated toward the bottom of the stack, the probability of occurrence of gas leakage stemming from separation of the connection member 35 further increases in the course of stacking.

Figure 9B:
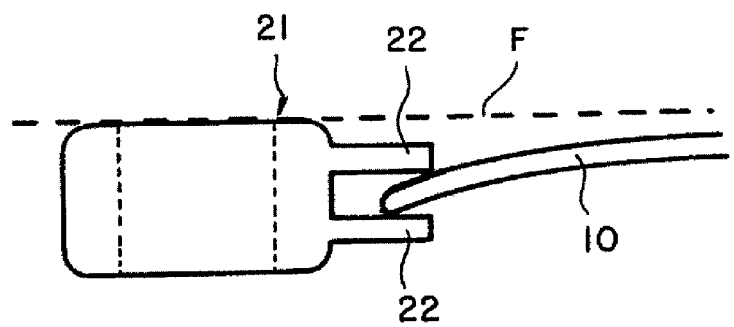
FIG. 9B is a schematic view showing the positional relation between the warped cell 10 and the retainer piece 21 in the stack structure of FIG. 8.

By contrast, in the present invention, as shown in FIG. 8, pressure D is borne by the stacked retainer pieces 21. An end portion of the cell 10 is held by the protrusions 22, and the upper and lower adjacent cells 10 do not cumulatively impose stress on the cell 10 therebetween. When the cell 10 is warped as shown in FIG. 9B, an outer peripheral portion of the cell 10 moves within the space between the protrusions 22. However, since the horizontality of the retainer piece 21 is maintained, the movement does not affect the state of retainment of the upper and lower cells 10. Further, since no additional load is imposed on the cells 10 in association with stacking, through inspection for gas leakage before stacking, the occurrence of gas leakage stemming from stacking can be readily prevented.

No particular limitation is imposed on material for the retainer piece, so long as the material has mechanical strength higher than that of ceramic used to form the cell. Preferably, the material differs from the cell in thermal expansion coefficient by $2\times10^{-6}$/K or less. Examples of such material include zirconia, magnesia, spinel ceramics, and a composite material thereof. The material may be metal, so long as the metal exhibits resistance to oxidation and resistance to reduction at an operating temperature of the electrochemical cell. The metal may be pure metal or an alloy. Preferred examples of such metal include nickel; a nickel-based alloy, such as INCONEL or NICHROME; an iron-based alloy, such as stainless steel; and a cobalt-based alloy, such as STELLITE.

In the present invention, no particular limitation is imposed on a method of connecting in series the anode and the cathode of adjacent cells. However, preferably, interconnectors are used for such serial connection. More preferably, the cells are received in the respective interconnectors.

In a preferred embodiment, the interconnector includes a receptacle portion for receiving a portion of the electrochemical cell therein, and connection portions projecting from the receptacle portion. The receptacle portion can be externally fitted to the cell, and covers the cell from the opposite sides of the cell, thereby forming flow channels for the second gas therebetween. The receptacle portion has through-holes formed therein at positions corresponding to conductive portions.

Material for the interconnector must be electrically conductive and must be resistant to the second gas at an operating temperature of the cell. Specifically, the material may be pure metal or an alloy. Nickel; a nickel-based alloy, such as INCONEL or NICHROME; an iron-based alloy, such as stainless steel; and a cobalt-based alloy, such as STELLITE, are preferred. Also, the material may be conductive ceramic. In this case, for example, lanthanum chromite is preferred.

Preferably, the connection portion is elastically deformable. Particularly preferably, the connection portion is formed from a metal plate. Examples of such metal include the above-mentioned materials for the interconnector.

Figure 10A:
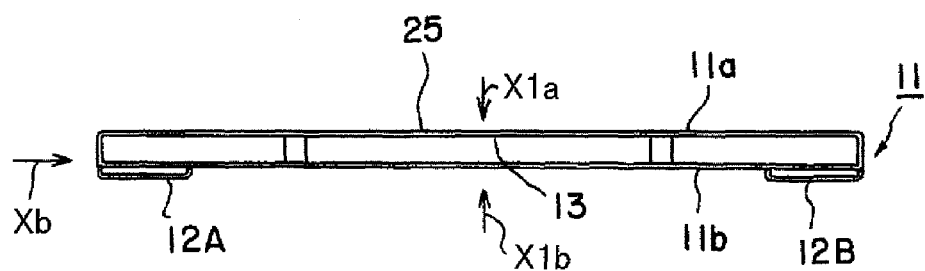
FIG. 10A is a side view of an interconnector 11.
Figure 10B:
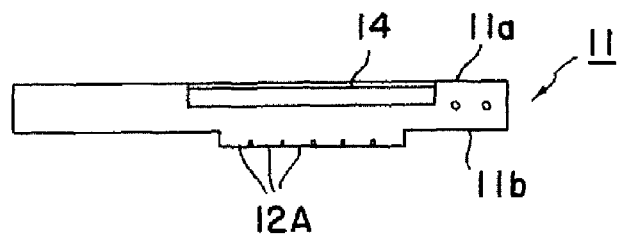
FIG. 10B is a front view of the interconnector 11 as viewed from the direction of arrow Xb of FIG. 10A.
Figure 11A:
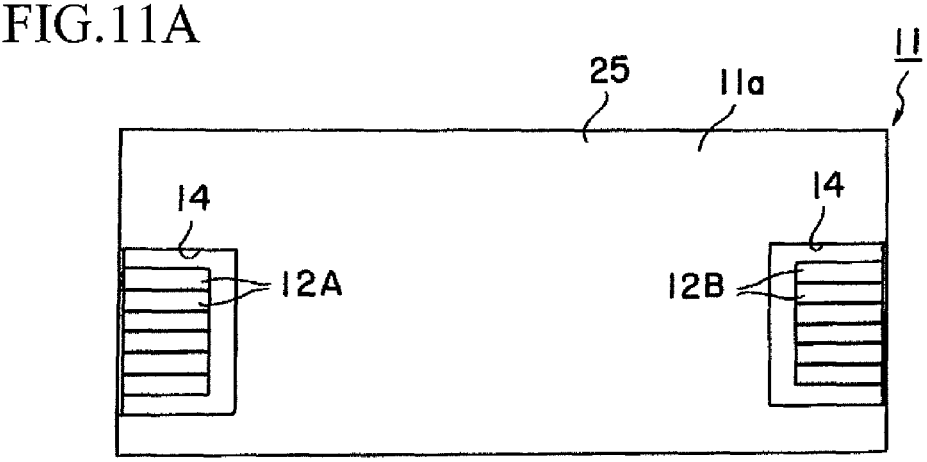
FIG. 11A is a plan view of the interconnector 11 as viewed from the direction of arrow X1a of FIG. 10A.
Figure 11B:
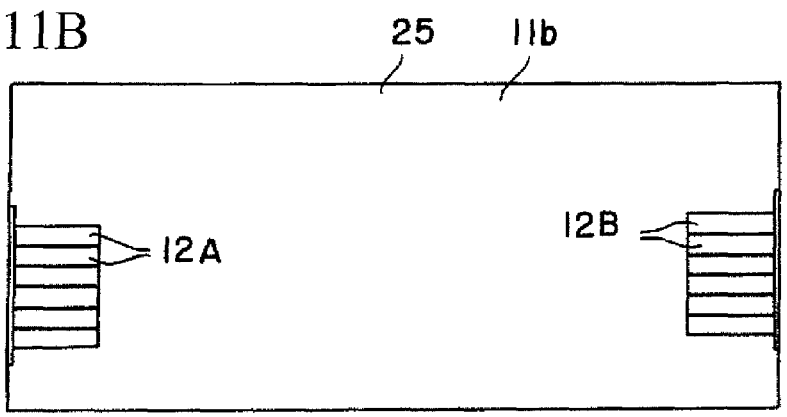
FIG. 11B is a bottom view of the interconnector 11 as viewed from the direction of arrow X1b of FIG. 10A.

FIG. 10A is a side view of an interconnector 11 according to an embodiment of the present invention, and FIG. 10B is a front view of the interconnector 11 as viewed from the direction of arrow Xb of FIG. 10A. FIG. 11A is a plan view of the interconnector 11 of FIG. 10A as viewed from above (direction of arrow X1a), and FIG. 11B is a bottom view of the interconnector 11 of FIG. 10A as viewed from underneath (direction of arrow X1b).

A receptacle portion 25 includes an upper plate 11a and a lower plate 11b, and a space 13 is formed between the upper plate 11a and the lower plate 11b. Connection portions 12A and 12B project from the lower plate 11b. In the present embodiment, each of the connection portions 12A and 12B is an assembly of a plurality of strips. The connection portions 12A and 12B are formed through working of a flat metal plate.

Particularly, as shown in FIG. 11A, the upper plate 11a has through-holes 14 formed therein at positions corresponding to the conductive portions 8A, 8B, 8C, and 8D of the cell 10. A single interconnector 11 has two through-holes 14 formed therein, and a single cell 10 is received in two interconnectors 11. Thus, the four conductive portions 8A, 8B, 8C, and 8D of each of the cells 10 can positionally coincide with the respective through-holes 14. As shown in FIG. 11A, since the through-holes 14 are greater in size than the connection portions 12A and 12B, the entire connection portions 12A and 12B can be seen from above through the through-holes 14.

Figure 12:
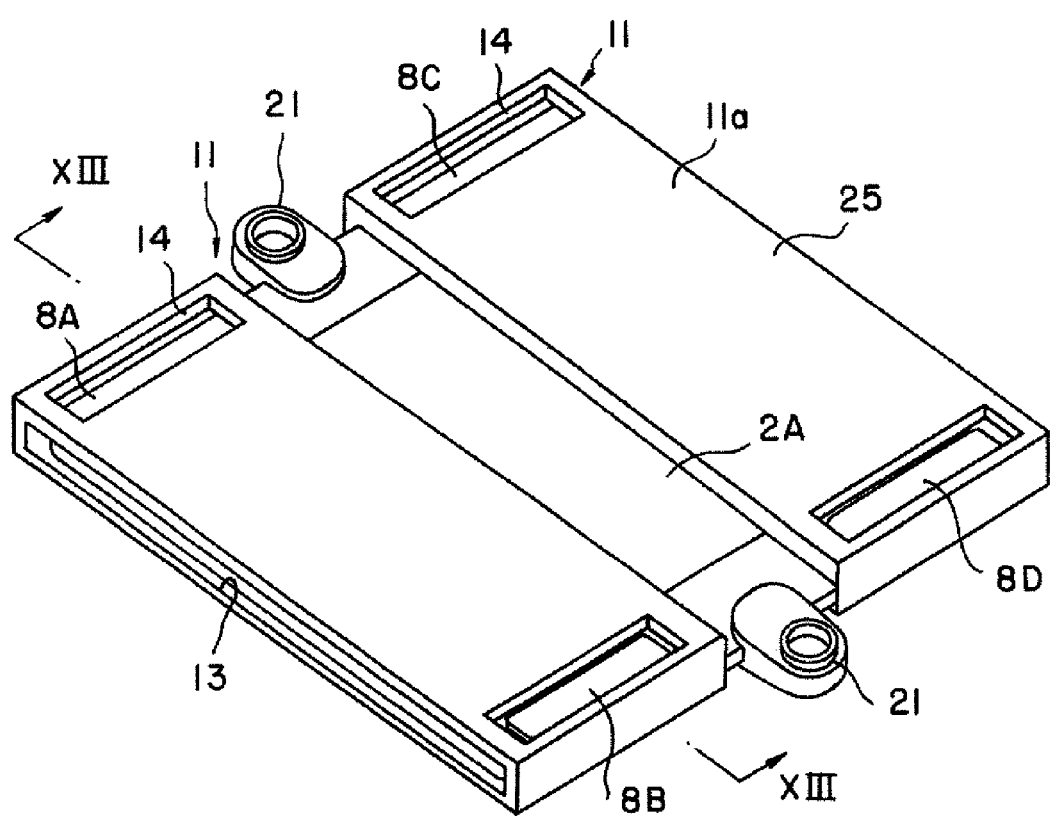
FIG. 12 is a perspective view showing a state in which the interconnectors 11 are fitted to the cell 10.

For example, the above-mentioned interconnectors 11 are fixedly fitted to each of the cells 10. As shown in FIG. 12, the receptacle portions 25 of the interconnectors 11 are laterally fitted to each of the cells 10 in such a manner as to cover the second electrodes 2A of the cell 10 and are fixed in position.

At this time, a flow channel for the second gas is formed between each of the interconnectors 11 and the second electrode 2A (2B) which faces the interconnector 11. A predetermined conductive connection member is accommodated within this gas flow channel and is brought into contact with the second electrode 2A (2B) and the receptacle portion 25, thereby establishing electrical connection between the second electrode 2A (2B) and the receptacle portion 25. No particular limitation is imposed on the material and form of the conductive connection member, and a known conductive connection member can be used. Examples of such conductive connection member include a metal felt and a metal mesh.

Upon completion of a stack, the conductive portions 8A to 8D of the top cell 10 and the interconnectors 11 of the bottom cell 10 are connected, whereby a plurality of the cells 10 are connected in series.

Figure 13:
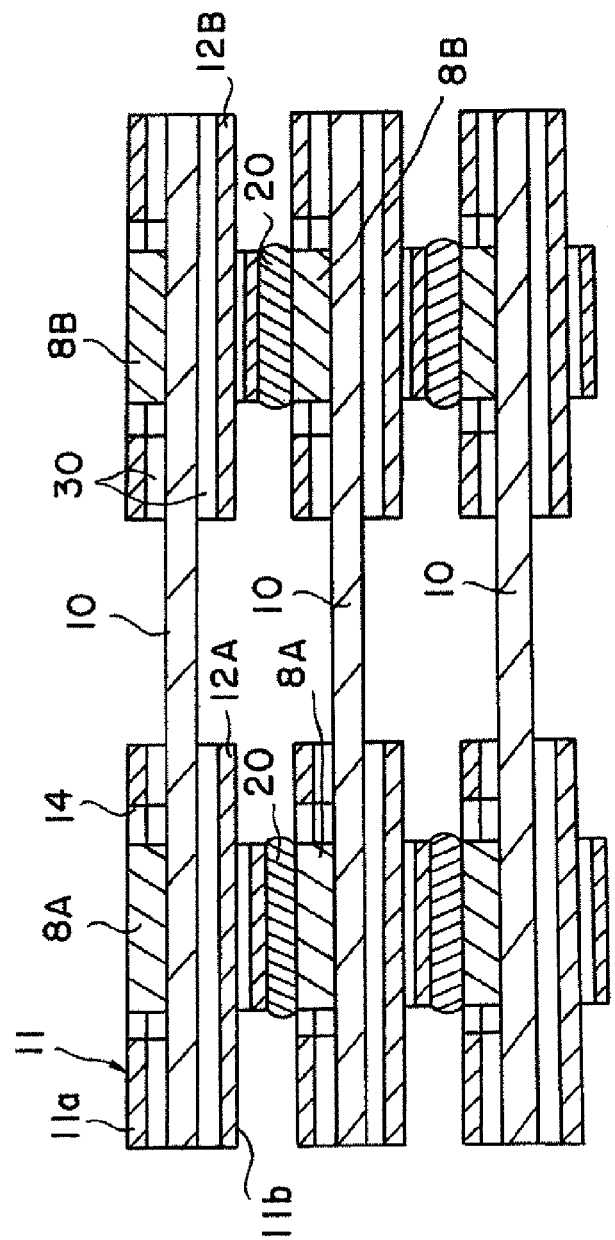
FIG. 13 is a schematic sectional view showing a state of connection of the cells 10 in the stack.

FIG. 13 schematically shows the state of connection of the adjacent cells 10. First, the receptacle portions 25 of the interconnectors 11 are laterally fitted to each of the cells 10. At this time, conductive paste 20 is placed between the connection portions 12A and 12B of each of the interconnectors 11 and the respective conductive portions 8A (8C) and 8B (8D) of the adjacent cell 10. Reference numeral 30 denotes a flow channel for the second gas.

In the present invention, the retainer piece can be divided into two or more components, and the components can be joined together in the course of assembly. Particularly preferably, one of the paired protrusions of the retainer piece is separated from a main piece. The separated protrusion piece can be joined to the main piece in the course of assembly. FIGS. 14 and 15 show the retainer piece of this type.

Figure 14A:
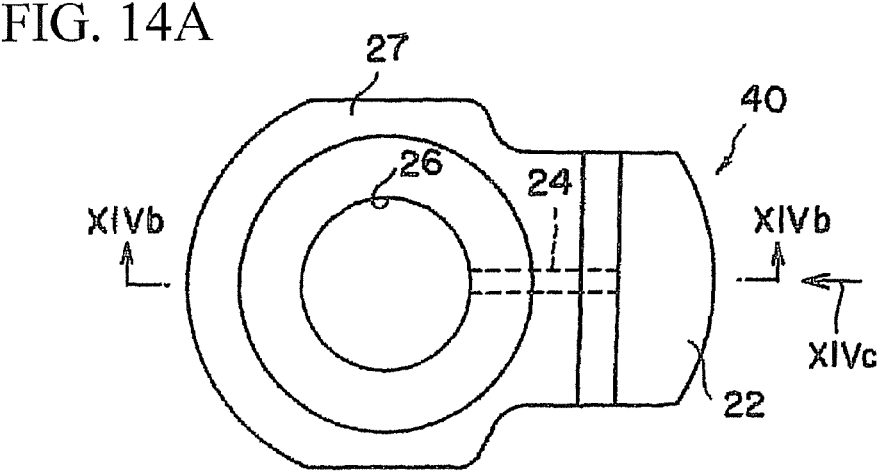
FIG. 14A is a plan view showing a main piece 40.
Figure 14B:
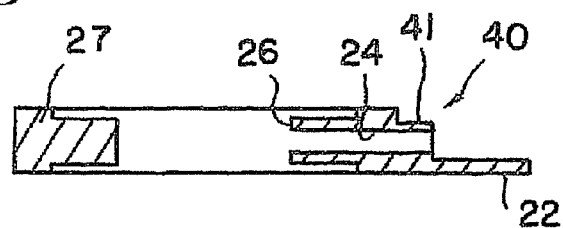
FIG. 14B is a sectional view of the main piece 40 taken along line XIVb-XIVb of FIG. 14A.
Figure 14C:
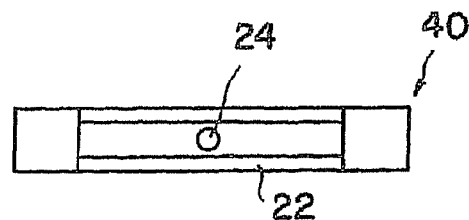
FIG. 14C is a front view of the main piece 40 as viewed from the direction of arrow XIVc of FIG. 14A.
Figure 14D:
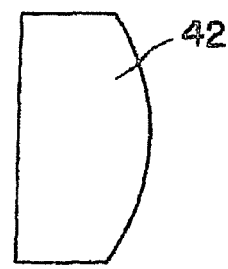
FIG. 14D is a plan view showing a protrusion piece 42 separated from the main piece 40.
Figure 15:
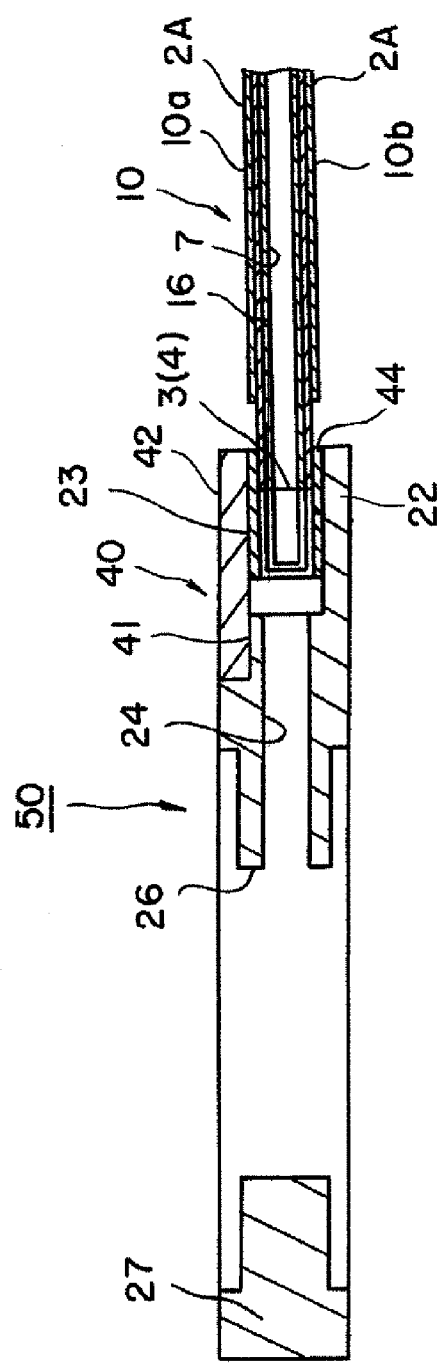
FIG. 15 is a sectional view showing a state in which the cell 10 is held by an assembled retainer piece 50.

FIG. 14A is a plan view showing a main piece 40; FIG. 14B is a sectional view of the main piece 40 taken along line XIVb-XIVb of FIG. 14A; and FIG. 14C is a front view of the main piece 40 as viewed from the direction of arrow XIVc of FIG. 14A. FIG. 14D is a plan view showing a protrusion piece 42 separated from the main piece 40.

The main piece 40 includes a body portion 27 assuming the form of a flat plate, and a protrusion 22 protruding from the body portion 27. The body portion 27 has the through-hole 26 formed therethrough and extending between paired main surfaces thereof. The protrusion 22 assumes the form of a flat plate and is fan-shaped as viewed in plane. The protrusion piece 42 is separated from the main piece 40 and can be attached to a shoulder 41 of the main piece 40.

As shown in FIG. 15, the cell 10 is placed on the protrusion 22. At this time, since only one side of the cell 10 is restrained by a retainer piece 50, the cell 10 can be readily joined onto the protrusion 22 with a bonding material 44 placed therebetween. Next, the separated protrusion piece 42 is joined onto the cell 10 with the bonding material 44 placed therebetween, and is attached to the shoulder 41 of the main piece 40. By this procedure, the retainer piece 50 is assembled, and the space 23 is formed between the protrusion 22 and the protrusion piece 42. The space 23 communicates with the through-hole 26 via the communication hole 24.

In the present embodiment, no particular limitation is imposed on a method of attaching the protrusion piece 42 to the main piece 40. However, preferably, a seal material of glass or ceramic, a mechanical coupling method, or a seal member is used. No particular limitation is imposed on such a seal material or member; however, the seal material or member must exhibit resistance to oxidation and resistance to reduction at an operating temperature of the electrochemical cell. Specific examples of the seal material include glass and crystallized glass which predominantly contain silica, and brazing metal. Also, examples of the seal member include O-rings, C-rings, E-rings, and compression seals, such as metal jacket gaskets and mica gaskets.

EXAMPLE

An example stack of the present invention was fabricated according to the method which has been described above with reference to FIGS. 1, 2, 4, 5, 6, 8, and 10 to 13.
Fabrication of Electricity-Generating Cells:
Solid oxide fuel cells each using a fuel electrode as a substrate were fabricated (see FIGS. 1 and 2).
Fabrication of Fuel Electrode Substrates:
A nickel oxide powder and a yttria-stabilized zirconia (YSZ) were mixed, thereby yielding a powder used to form fuel electrode substrates. The powder was die-pressed into two fuel electrode substrate compacts. Integration of flow-channel formation member with fuel electrode substrate, and formation of electrolyte membrane:
A flow-channel formation member was sandwiched between the fuel electrode substrate compacts, and the resultant assembly was pressed for integration.

Binder was added to a YSZ powder, thereby yielding slurry used to form electrolyte. The slurry was applied onto the fuel electrode substrate compact, followed by drying and then firing in an electric furnace at 1,400° C. for two hours in air. Thus, the fuel electrode substrate 16 coated with the solid electrolyte 6 was yielded.
Formation of Air Electrodes and Conductive Plates:
Binder and solvent were added to an LaMnO$_3$ powder, thereby yielding paste. The paste was screen-printed onto two main surfaces of the fuel electrode support substrate 16, followed by drying and then firing in the electric furnace at 1,200° C. for one hour in air. Thus, the air electrodes 2A were formed. Portions of the electrolyte 6 were removed so as to expose the fuel electrode substrate 16. Conductive plates each having a thickness of 0.3 mm were separately prepared from lanthanum chromite and were affixed to the respective exposed portions by use of conductive paste, thereby forming the conductive plates 8A to 8D. The conductive plates 8A to 8D were peripherally fixed with seal material.

The thus-yielded sintered body was subjected to machining for forming the recess portions 20A and 20B, the fuel supply hole 3, and the fuel discharge hole 4, thereby yielding the electricity-generating cell 10. The fabricated cell 10 had a length of 100 mm, a width of 50 mm, and a thickness of 2.0 mm.
Fabrication of Retainer Pieces:
A composite material of spinel (MgAl$_2$O$_4$) and magnesia (MgO) was machined into the shape shown in FIG. 4. The thus-formed retainer piece had a length of 30 mm, a width of 20 mm, and a thickness of 3.5 mm.
Fabrication of Stack:
A 20-level stack was fabricated such that each level was composed of the cell 10 and the retainer pieces 21 (see FIG. 8).
Bonding of Cells and Retainer Pieces:
The retainer pieces 21 were attached to each of the cells 10 at positions corresponding to the fuel supply hole 3 and the fuel discharge hole 4 by use of the glass paste 40 which was softened at 1,000° C. The thus-prepared cells 10 were stacked at 20 levels, followed by heating in the electric furnace at 1,000° C. for one hour in air for bonding.
Attachment of Interconnectors:
A plate of SUS430 was machined into the interconnectors 11 each having the shape shown in FIGS. 10 and 11. Each of the interconnectors 11 had a length of 60 mm, a width of 105 mm, and a thickness of 0.5 mm. Embossed current-collecting mesh was inserted into each of the interconnectors 11; conductive paste was applied to projecting portions of the interconnectors 11; and the interconnectors 11 were fitted to the individual cells 10 from laterally opposite directions.

Comparative Example

The ceramic connection members 35 each having an outside diameter of 24 mm, an inside diameter of 9 mm, and a thickness of 2 mm were attached to each of the cells 50 at positions corresponding to the fuel supply hole and the fuel discharge hole by use of glass paste which was softened at 1,000° C. The thus-prepared cells 50 were stacked at 20 levels, followed by heating in the electric furnace at 1,000° C. for one hour in air for bonding. Thus, the stack shown in FIG. 7 was yielded.
$83
Evaluation of Antileak Performance During Generation of Electricity:
In order to evaluate antileak performance, the stacks of Example and Comparative Example were set in the electric furnace in a state in which the conductive portions of the top cell and the connection portions of the bottom interconnector were connected by a voltage wire and a current wire. While N$_2$ gas was supplied to the fuel-electrode side, and air was supplied to the air-electrode side, the furnace temperature was raised to 800° C. When the furnace temperature reached 800° C., H$_2$ gas was supplied to the fuel-electrode side for carrying out a reduction process. After execution of 3-hour reduction process, the stacks were measured for current-voltage characteristic. At this time, the recovered gas flow rate was measured, and antileak performance was evaluated on the basis of gas recovery percentage defined by the following expression. Table 1 shows the result of evaluation.

Gas recovery percentage=(recovered gas flow rate)/
(charged gas flow rate)

TABLE 1

|  | Gas recovery percentage [%] | Variation among cell-to-cell distances [mm] |
|---|---|---|
| Example | 100 | <1 |
| Comparative Example | 89 | 1 to 3 |

The Example of the present invention exhibited a reduction in the rate of occurrence of cell cracking as compared with the Comparative Example and the following specific improvement: a gas recovery percentage of 100% and a variation among cell-to-cell distances of 1 mm or less.

Thus, according to the present invention, in the course of stacking, loads of cells are not cumulatively imposed on lower cells, and stress imposed on individual cells is distributed, so that the rate of occurrence of gas leakage can be greatly reduced. Additionally, even when a cell(s) is warped, the horizontality of retainer pieces can be maintained, so that variation among cell-to-cell distances can be lowered.

Another Embodiment

Figure 16:
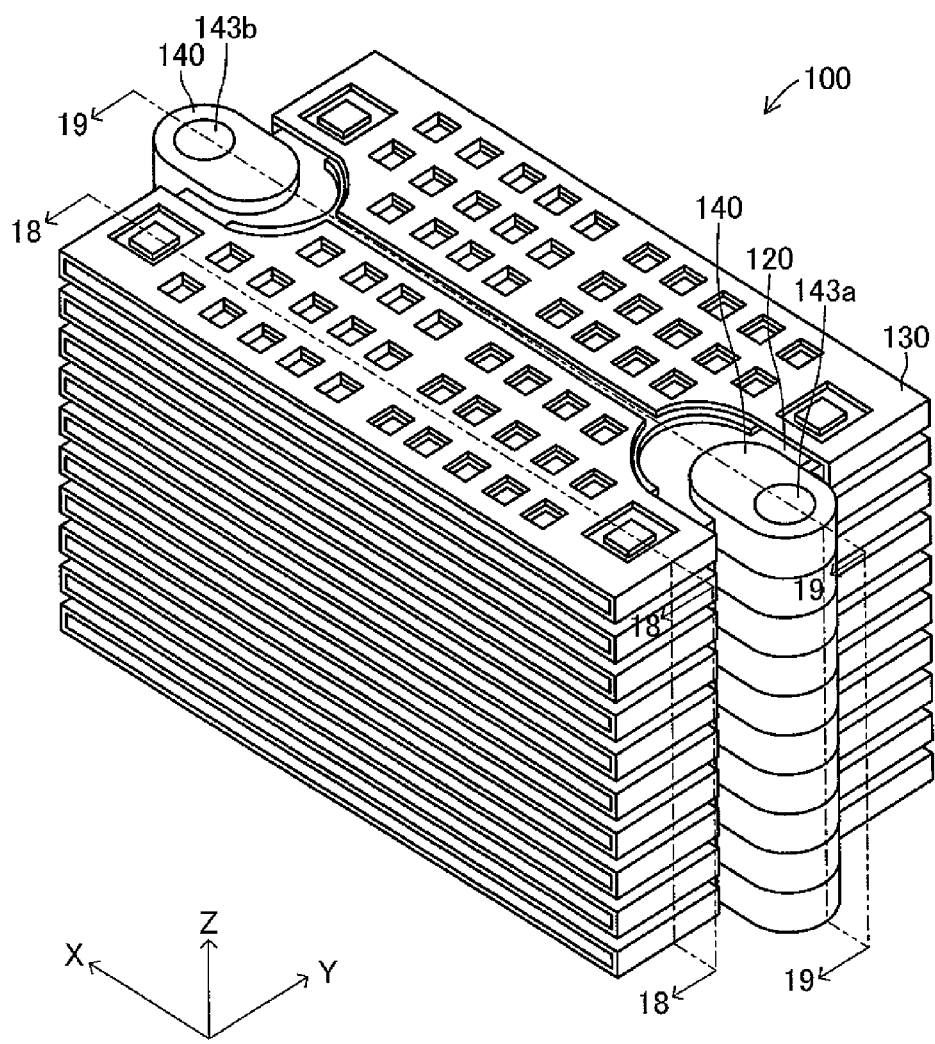
FIG. 16 is a perspective view of a solid oxide fuel cell apparatus 100 according to another embodiment of the present invention.
Figure 17:
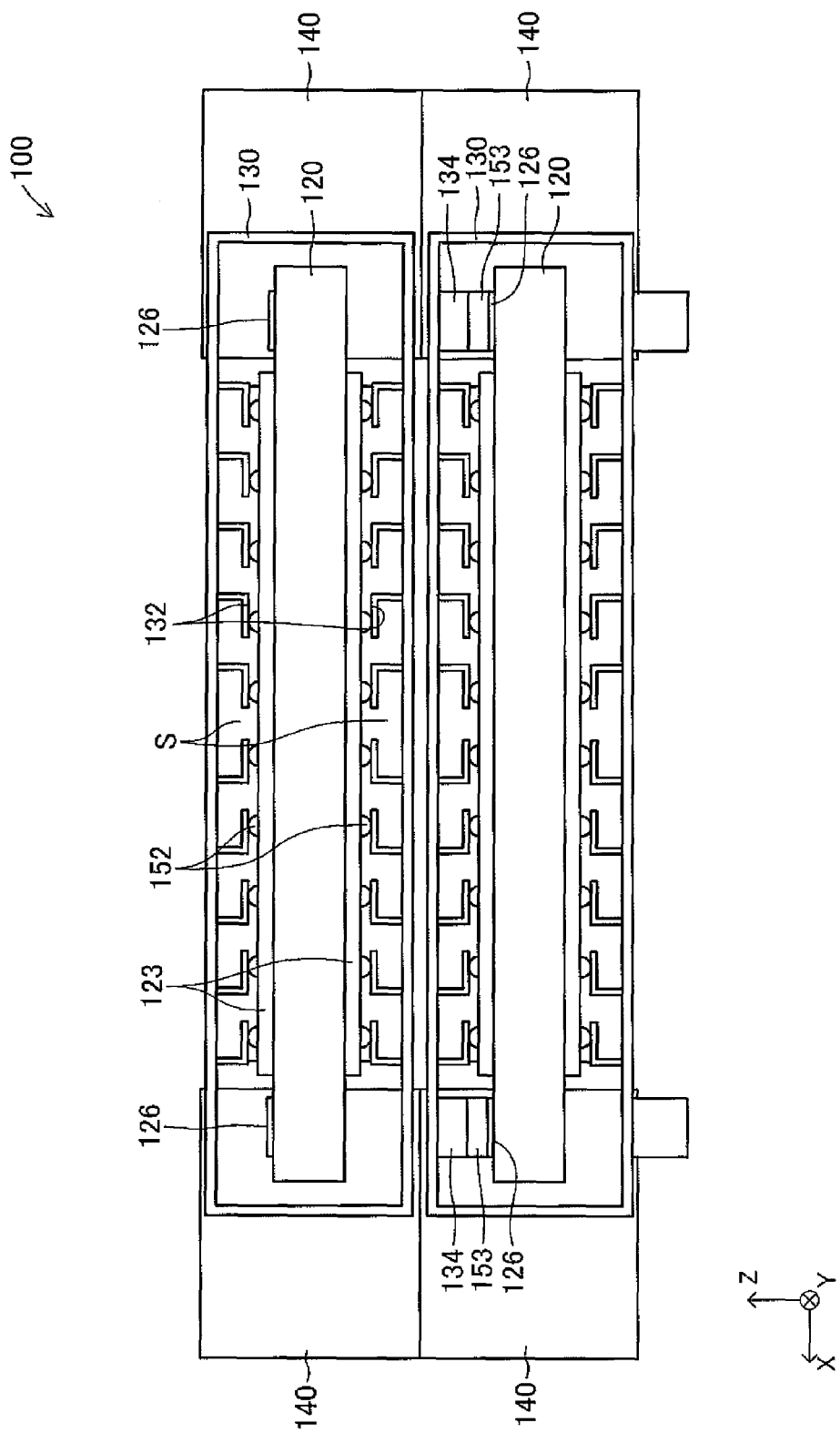
FIG. 17 is a partial view of the fuel cell apparatus 100 as viewed from the direction of the y-axis in FIG. 16.
Figure 18:
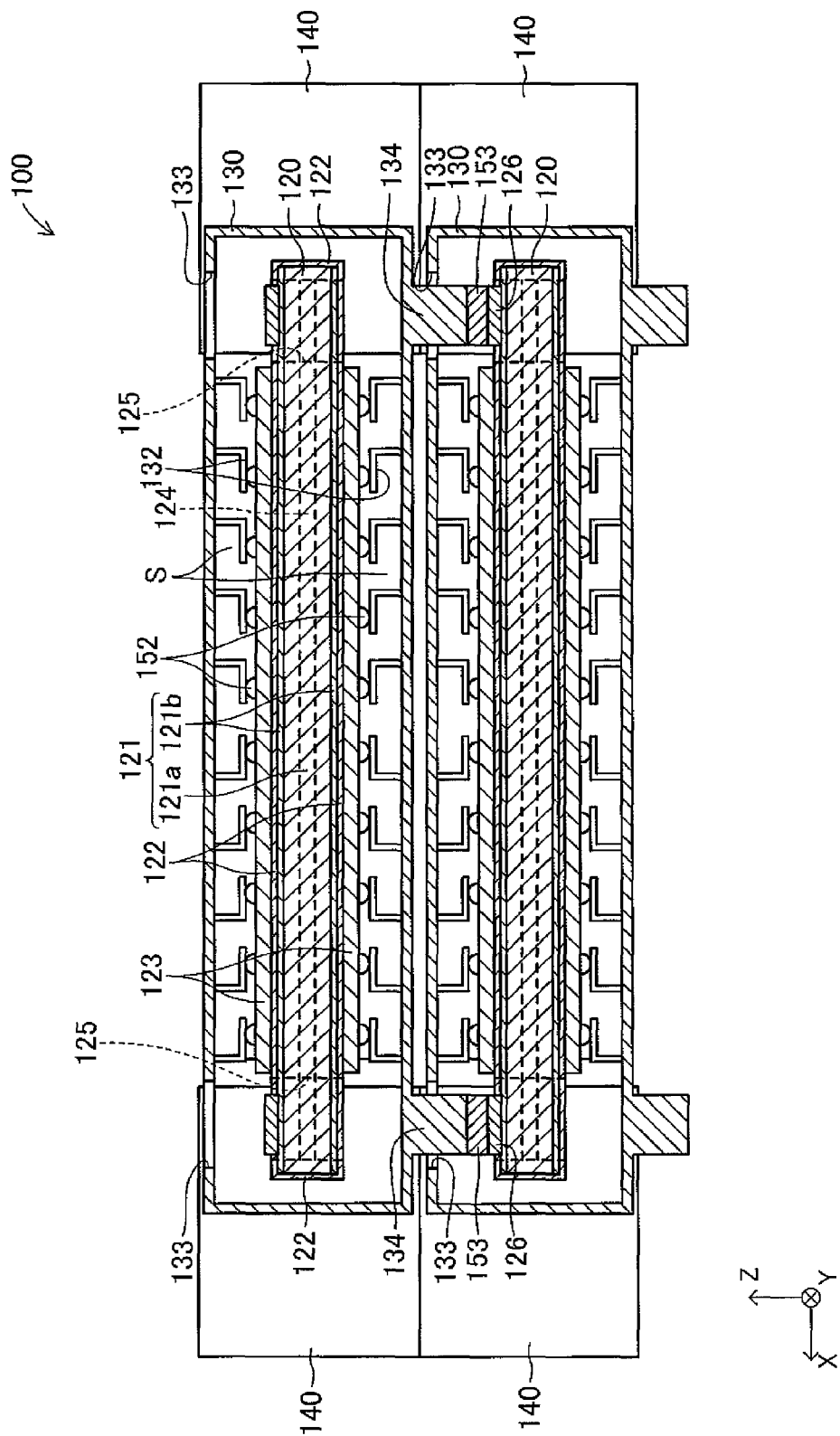
FIG. 18 is a partial, sectional view of the fuel cell apparatus 100 as cut along an x-z plane which contains line 18-18 of FIG. 16.
Figure 19:
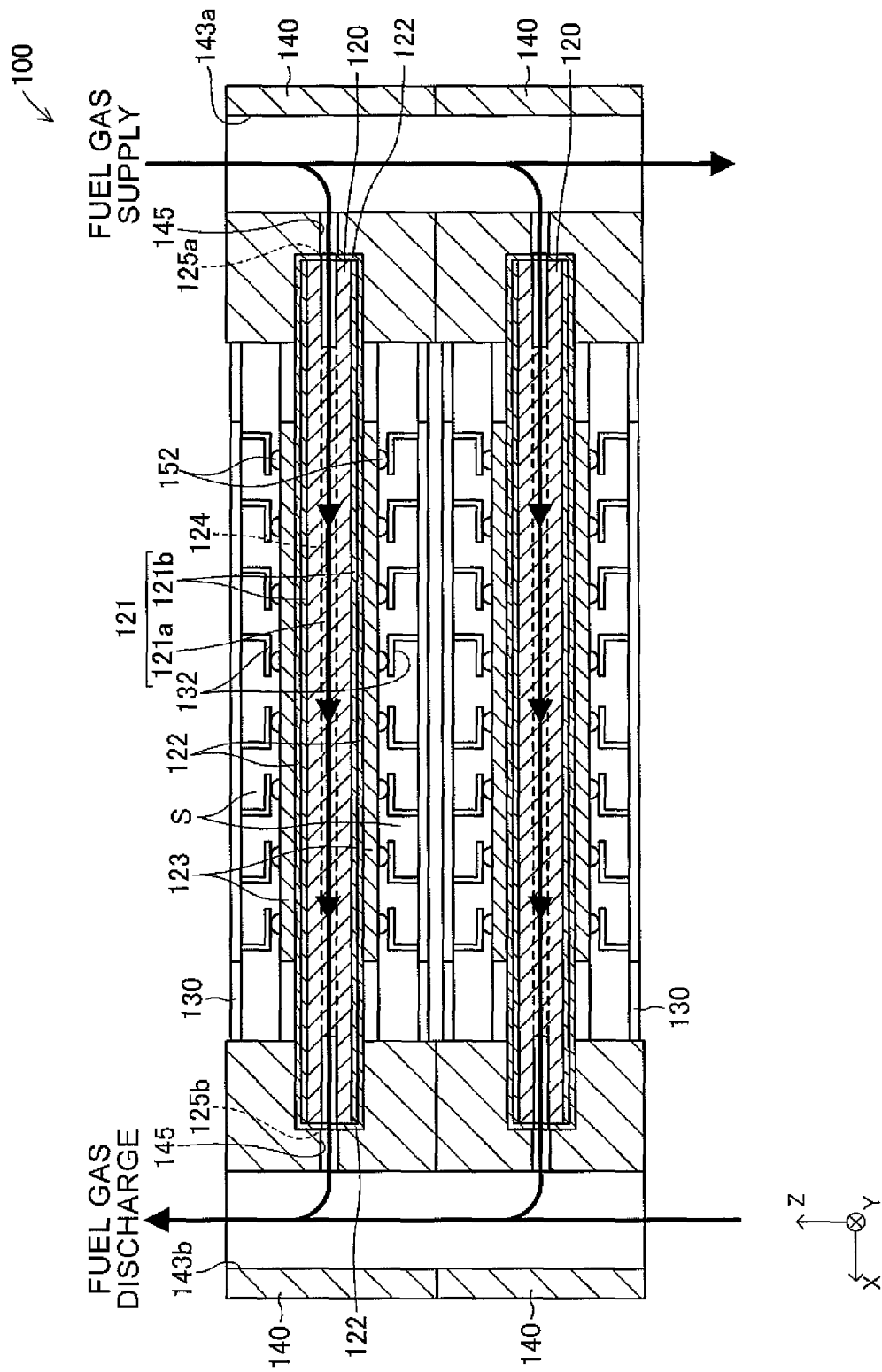
FIG. 19 is a partial, sectional view of the fuel cell apparatus 100 as cut along an x-z plane which contains line 19-19 of FIG. 16.
Figure 20:
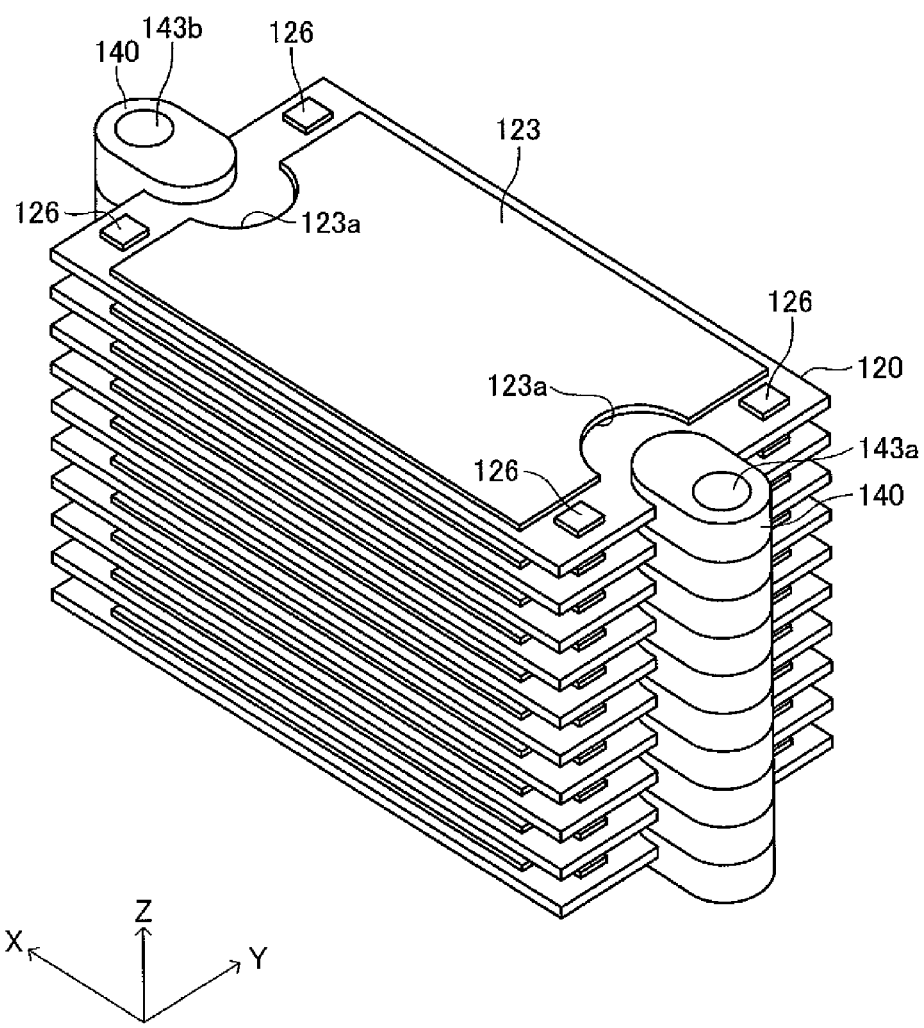
FIG. 20 is a perspective view of the fuel cell apparatus 100 of FIG. 16, showing a state before attachment of interconnectors 130.
Figure 21:
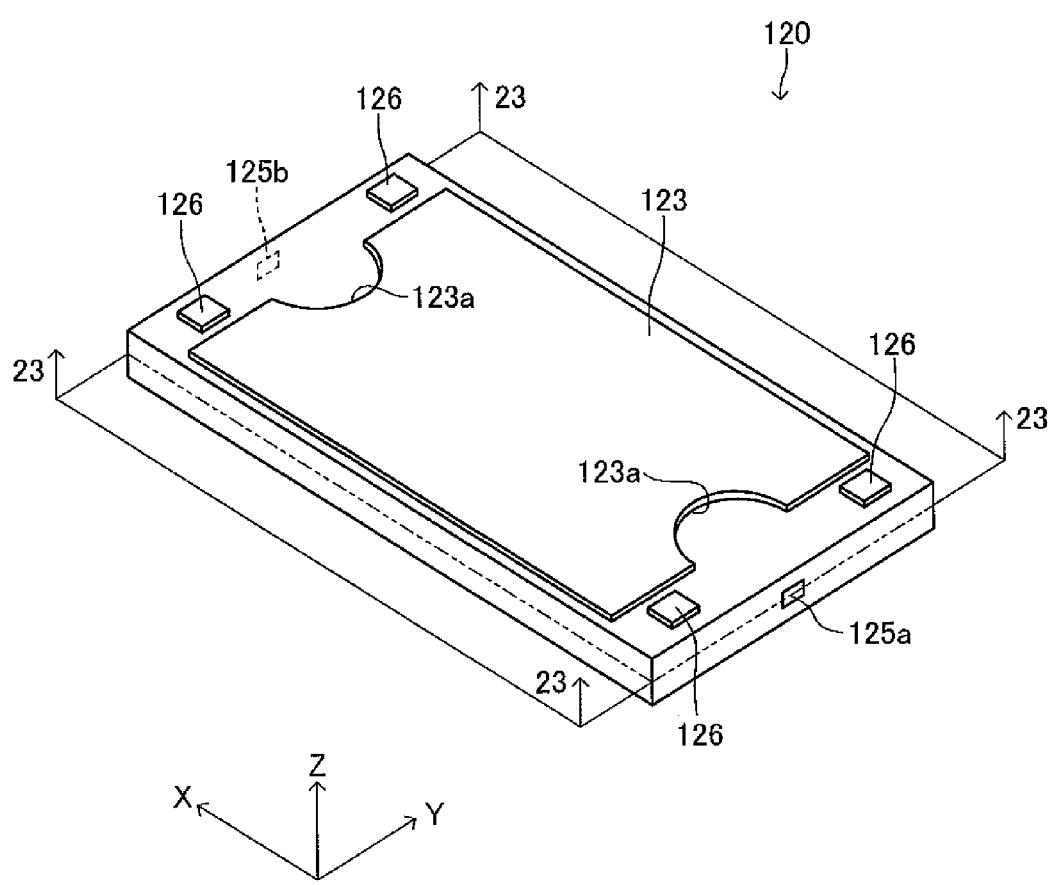
FIG. 21 is a perspective view of a cell 120 for use in the fuel cell apparatus 100 of FIG. 16.
Figure 22:
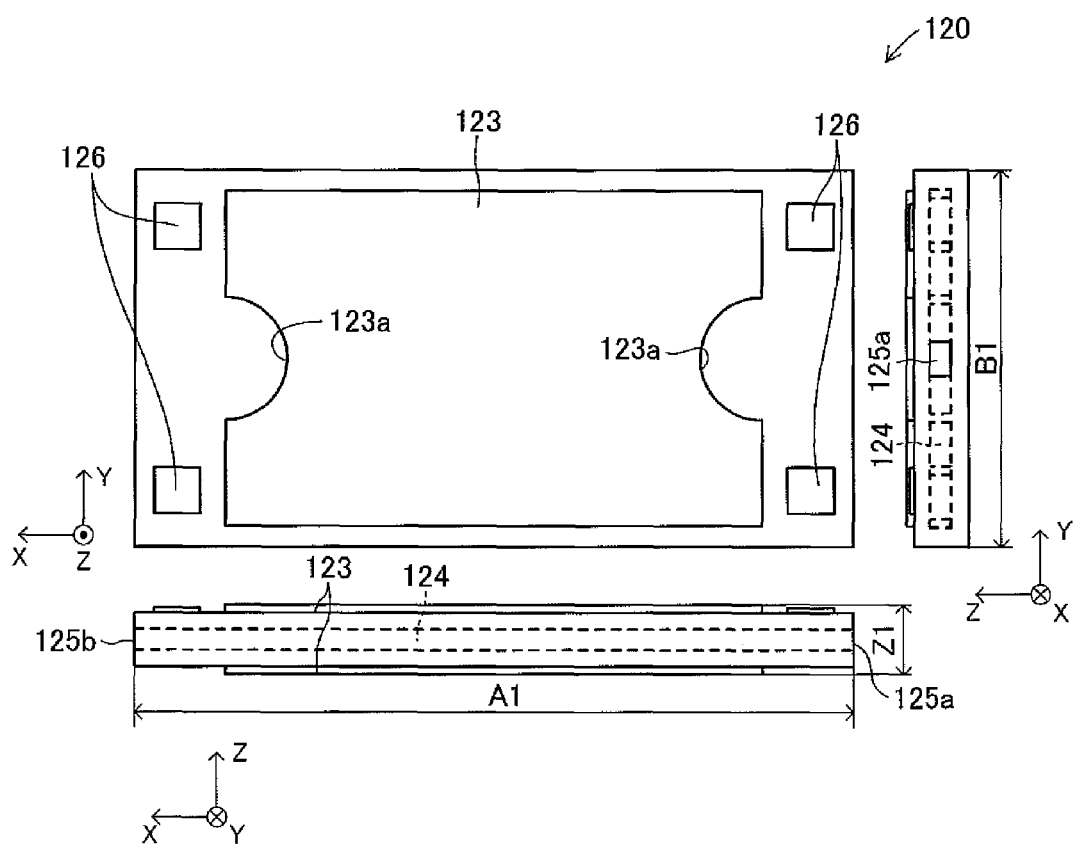
FIG. 22 is a set of views showing the cell 120 of FIG. 21 according to the third angle system, as viewed from the x-, y-, and z-axis directions, respectively.

Next, a solid oxide fuel cell apparatus according to an embodiment of the present invention will be described with reference to FIGS. 16 to 31.
Overall Structure of Fuel Cell Apparatus:

FIG. 16 shows a solid oxide fuel cell apparatus (hereinafter, referred to merely as "fuel cell apparatus") 100 according to another embodiment of the present invention. FIG. 17 is a partial view of the fuel cell apparatus 100 as viewed from the direction of the y-axis; FIG. 18 is a partial, sectional view, corresponding to FIG. 17, of the fuel cell apparatus 100 as cut along an x-z plane which contains line 18-18 of FIG. 16; and FIG. 19 is a partial, sectional view, corresponding to FIG. 17, of the fuel cell apparatus 100 as cut along an x-z plane which contains line 19-19 of FIG. 16. FIG. 20 is a view of the fuel cell apparatus 100 of FIG. 16, showing a state before attachment of interconnectors 130. The x-axis and the y-axis are orthogonal to each other, and the z-axis is perpendicular to the x-y plane. Hereinafter, the positive direction of the z-axis may be referred to as the "upward" direction, and the negative direction of the z-axis may be referred to as the "downward" direction. For convenience of viewing an illustrated shape, the shape (aspect ratio, etc.) of a member may differ among a plurality of drawings.

As will be understood from FIGS. 16 to 20, the fuel cell apparatus 100 includes a plurality of cells 120 of the same type, a plurality of the interconnectors 130 of the same shape, and a plurality of retainer pieces 140 of the same shape. The cell 120 is also called "a single cell" of the fuel cell apparatus 100. A pair of retainer pieces 140 is attached to each of the cells 120 at central portions of respective opposite ends with respect to the x-axis direction of the cell 120. Pairs of the retainer pieces 140 are stacked, whereby a plurality of the cells 120 are stacked such that two adjacent ones of the cells 120 are spaced apart from each other in the z-axis direction. That is, the fuel cell apparatus 100 has a stack structure. Additionally, the interconnectors 130 are attached to the individual cells 120.

First, the cell 120 will be described with reference to FIGS. 17 to 23. The cell 120 roughly assumes the form of a rectangular parallelepiped having sides along the x-, y-, and z-axes (a thin plate whose thickness direction is along the z-axis). In the present embodiment, the length A1 of the side (long side) along the x-axis is 30 mm to 300 mm; the length B1 of the side (short side) along the y-axis is 15 mm to 150 mm; and the thickness Z1 is 0.5 mm to 5 mm (see FIG. 22). Two surfaces (upper surface and lower surface) in parallel with the x-y plane correspond to the "main surfaces," and two surfaces in parallel with the x-z plane and two surfaces in parallel with the y-z plane collectively correspond to the "side surface." The area of one main surface is greater than that of the surface in parallel with the x-z or y-z plane.

The cell 120 includes a fuel electrode layer 121, an electrolyte layer 122, and a pair of air electrode layers 123. The fuel electrode layer 121 assumes the form of a rectangular parallelepiped having sides along the x-, y-, and z-axes (a thin plate whose thickness direction is along the z-axis). The fuel electrode layer 121 includes a fuel electrode current-collection layer (substrate) 121a and fuel electrode activation layers 121b formed respectively on the upper and lower surfaces of the fuel electrode current-collection layer 121a.

Figure 23:
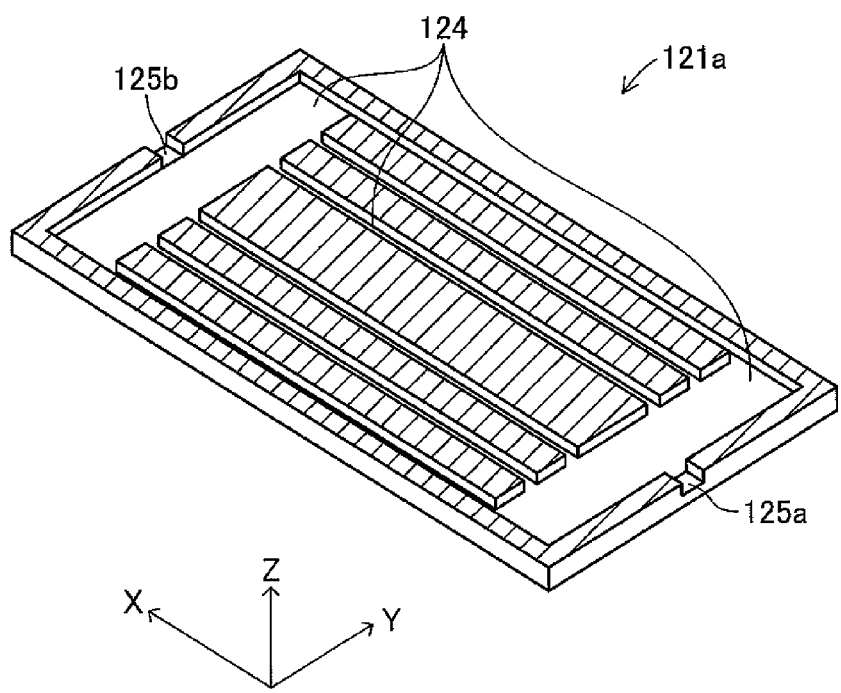

The fuel electrode current-collection layer 121a has an inner flow channel 124 formed therein and adapted to allow flow of fuel gas (e.g., hydrogen gas) (see, particularly, FIG. 23). Two side surfaces of the fuel electrode current-collection layer 121a in parallel with the y-z plane have an inflow port 125a and an outflow port 125b formed therein respectively at their central portions. The inflow port 125a communicates with the outflow port 125b via the inner flow channel 124 formed in the interior of the fuel electrode current-collection layer 121a (see, particularly, FIGS. 21 and 23).

The electrolyte layer 122 is a thin membrane formed on the fuel electrode layer 121 in such a manner as to cover the entire surface (upper and lower surfaces and side surface) of the fuel electrode layer 121. The paired air electrode layers 123 are formed respectively on the upper surface of such a portion of the electrolyte layer 122 which is formed on the upper surface of the fuel electrode layer 121 (more specifically, on the upper surface of the fuel electrode activation layer 121b formed on the upper surface of the fuel electrode current-collection layer 121a) and on the lower surface of such a portion of the electrolyte layer 122 which is formed on the lower surface of the fuel electrode layer 121 (more specifically, on the lower surface of the fuel electrode activation layer 121b formed on the lower surface of the fuel electrode current-collection layer 121a). The paired air electrode layers 123 are exposed to the exterior of the cell 120. The paired air electrode layers 123 assume the form of thin plates of the same shape having a thickness direction along the z-axis. Each of the paired air electrode layers 123 has a pair of cutouts 123a in order to avoid interference with the paired retainer pieces 140.

In the present embodiment, the fuel electrode current-collection layer 121a is a porous sintered body formed from Ni and YSZ (yttria-stabilized zirconia) (as viewed after the above-mentioned reduction process). The fuel electrode activation layer 121b is also a porous sintered body formed from Ni and YSZ (as viewed after the above-mentioned reduction process), but is higher in YSZ content than the fuel electrode current-collection layer 121a. The fuel electrode activation layer 121b is used mainly to enhance the rate of the reaction expressed by Formula (2), which will be described later. The fuel electrode current-collection layer 121a is used mainly to conducts electrons ($e^-$) generated from the reaction expressed by Formula (2), which will be described later, to conductive plates 126, which will be described later. The thickness of the fuel electrode activation layer 121b is sufficiently smaller than that of the fuel electrode current-collection layer 121a.

The fuel electrode activation layer 121b can be eliminated. The fuel electrode layer 121 functions as a fuel electrode (anode).

The electrolyte layer 122 is a dense sintered body formed from YSZ. Each of the air electrode layers 123 is a porous sintered body formed from LSCF ($La_{0.6}Sr_{0.4}Co_{0.2}Fe_{0.8}O_3$: lanthanum strontium cobalt ferrite) and functions as an air electrode (cathode). A reaction prevention layer, such as ceria ($CeO_2$), may be provided between the electrolyte layer 122 and the air electrode layer 123. Specific examples of ceria include GDC (gadolinium-doped ceria) and SDC (samarium-doped ceria). The entire cell 120 has an average thermal expansion coefficient over a range of room temperature to 1,000° C. of about 12.8 ppm/K.

The conductive plates 126 are disposed at respective four corners on the upper surface of the cell 120 and are each formed from a conductor electrically connected to the fuel electrode layer 121 located within the cell 120. Material for the conductive plates 126 is, for example, heat-resistant metal. Preferred examples of such heat-resistant metal include ZMG material (product of Hitachi Metals, Ltd.), which is ferritic stainless steel for use in a fuel cell. Alternatively, conductive ceramic is used as material for the conductive plates 126. Preferred examples of conductive ceramic include lanthanum chromite.

The upper surface of each of the conductive plates 126 (i.e., the upper surface of conductor) is exposed to the exterior of the cell 120. As will be described later, in the above-mentioned stacked state, the conductive plates 126 function as connectors for electrical connection to leg portions 134, which will be described later, of the interconnector 130 located adjacently above the interconnector 130 which accommodates the cell 120 associated with the conductive plates 126.

Figure 24:
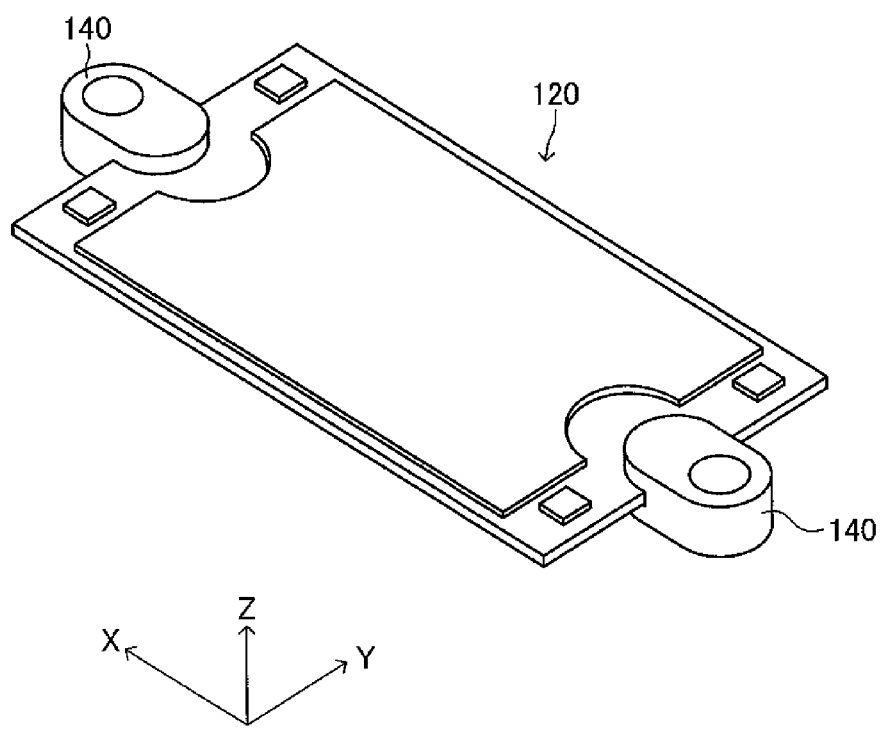
FIG. 24 is a perspective view showing a state in which retainer pieces 140 are attached to an outer peripheral portion of the cell 120 of FIG. 21 at positions corresponding to an inflow port 125a and an outflow port 125b.

Next, the retainer piece 140 will be described with reference to FIGS. 17 to 20 and 24 to 27. As shown in FIG. 24, the retainer pieces 140 are members to be attached respectively to central portions of two side surfaces in parallel with the y-z plane of each of the cells 120.

Figure 25:
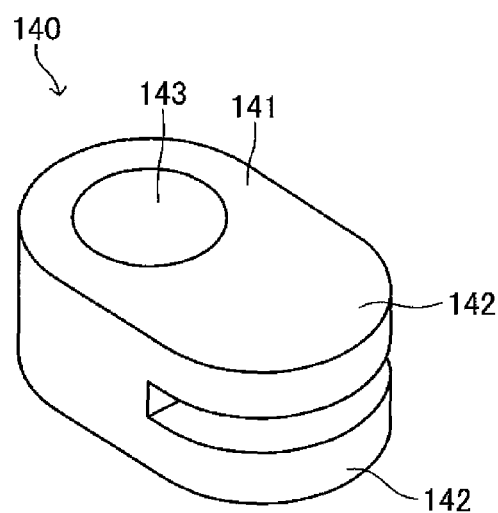
FIG. 25 is a perspective view of the retainer piece 140 shown in FIG. 24.
Figure 26A:
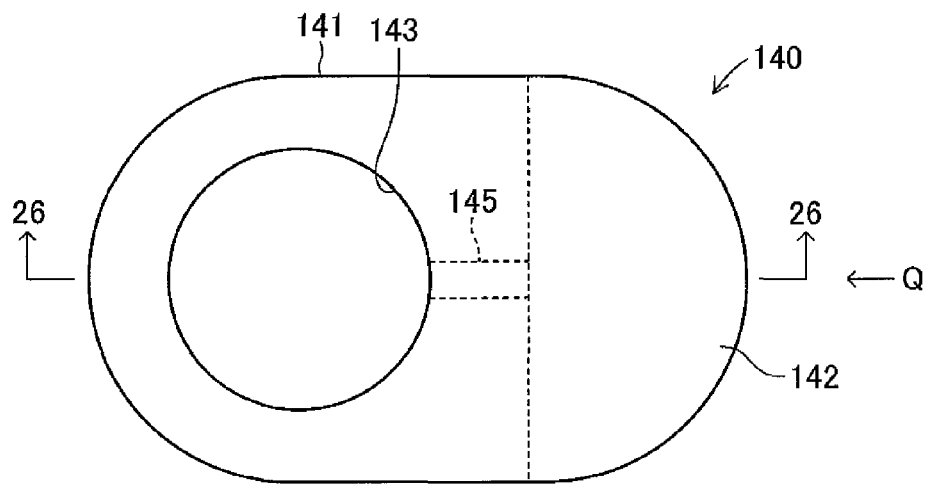
FIG. 26A is a plan view of the retainer piece 140 of FIG. 24.
Figure 26B:
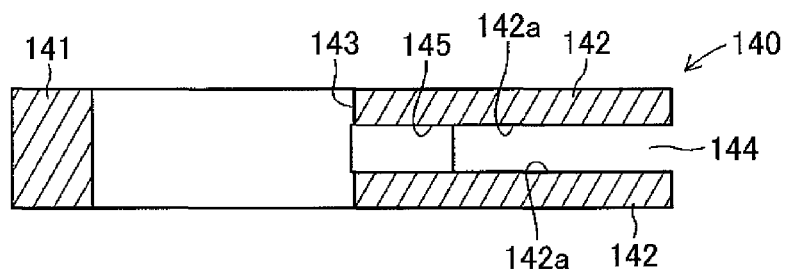
FIG. 26B is a sectional view of the retainer piece 140 taken along line 26-26 of FIG. 26A.
Figure 26C:
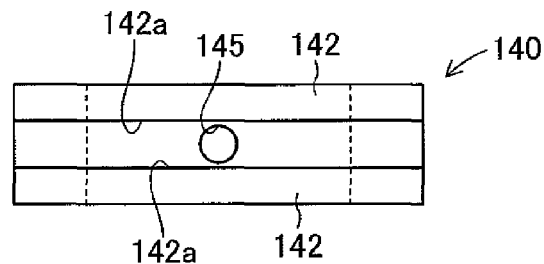
FIG. 26C is a front view of the retainer piece 140 as viewed from the direction of arrow Q of FIG. 26A.

As shown in FIGS. 25 and 26, the retainer piece 140 includes a body portion 141 and a pair of protrusions 142 protruding from the body portion 141. The body portion 141 has a through-hole 143 extending therethrough in the vertical direction. Each of the protrusions 142 assumes the form of a flat plate, and paired inner surfaces (retaining surfaces) 142a of the paired protrusions 142 parallelly face each other and are spaced apart from each other in the vertical direction. A space 144 between the paired retaining surfaces 142a communicates with the through-hole 143 via a communication hole 145.

Figure 27:
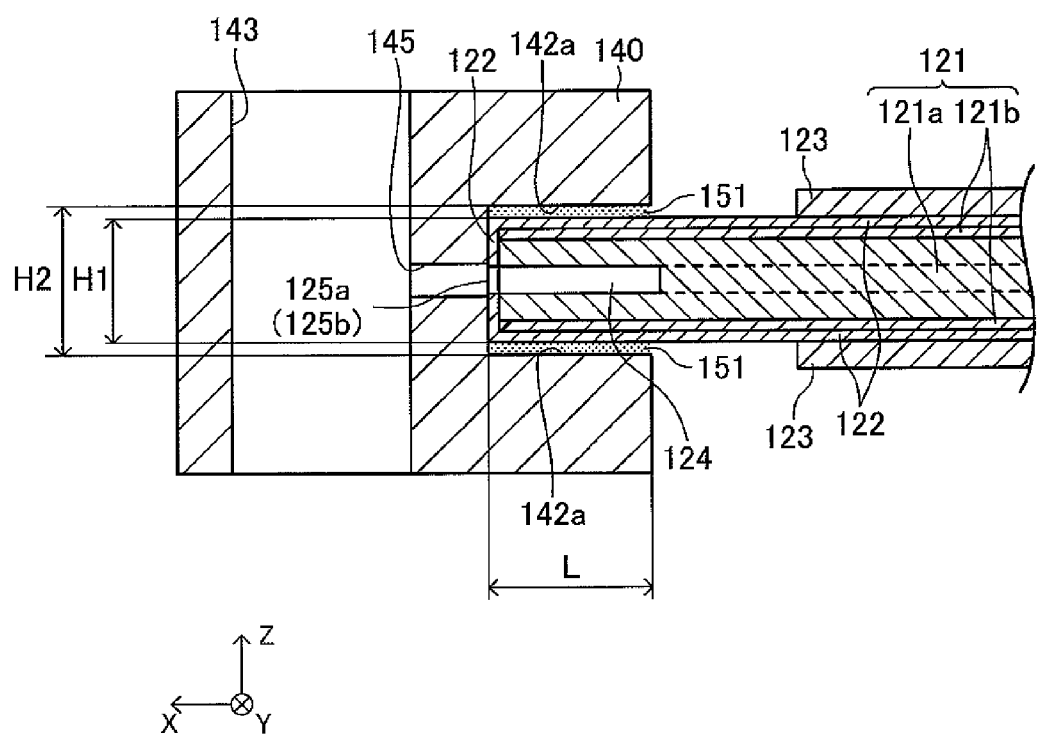
FIG. 27 is a sectional view showing a state in which the cell 120 is held by the retainer piece 140.
Figure 28:
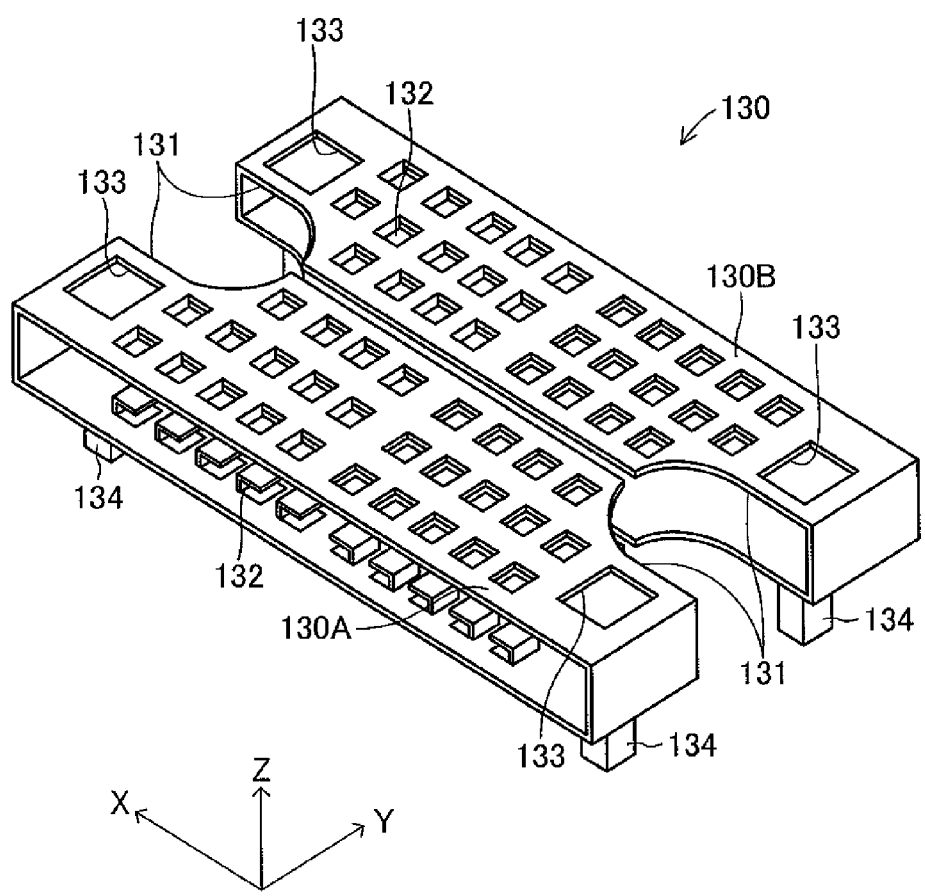
FIG. 28 is a perspective view of the interconnector 130 shown in FIG. 16.
Figure 29:
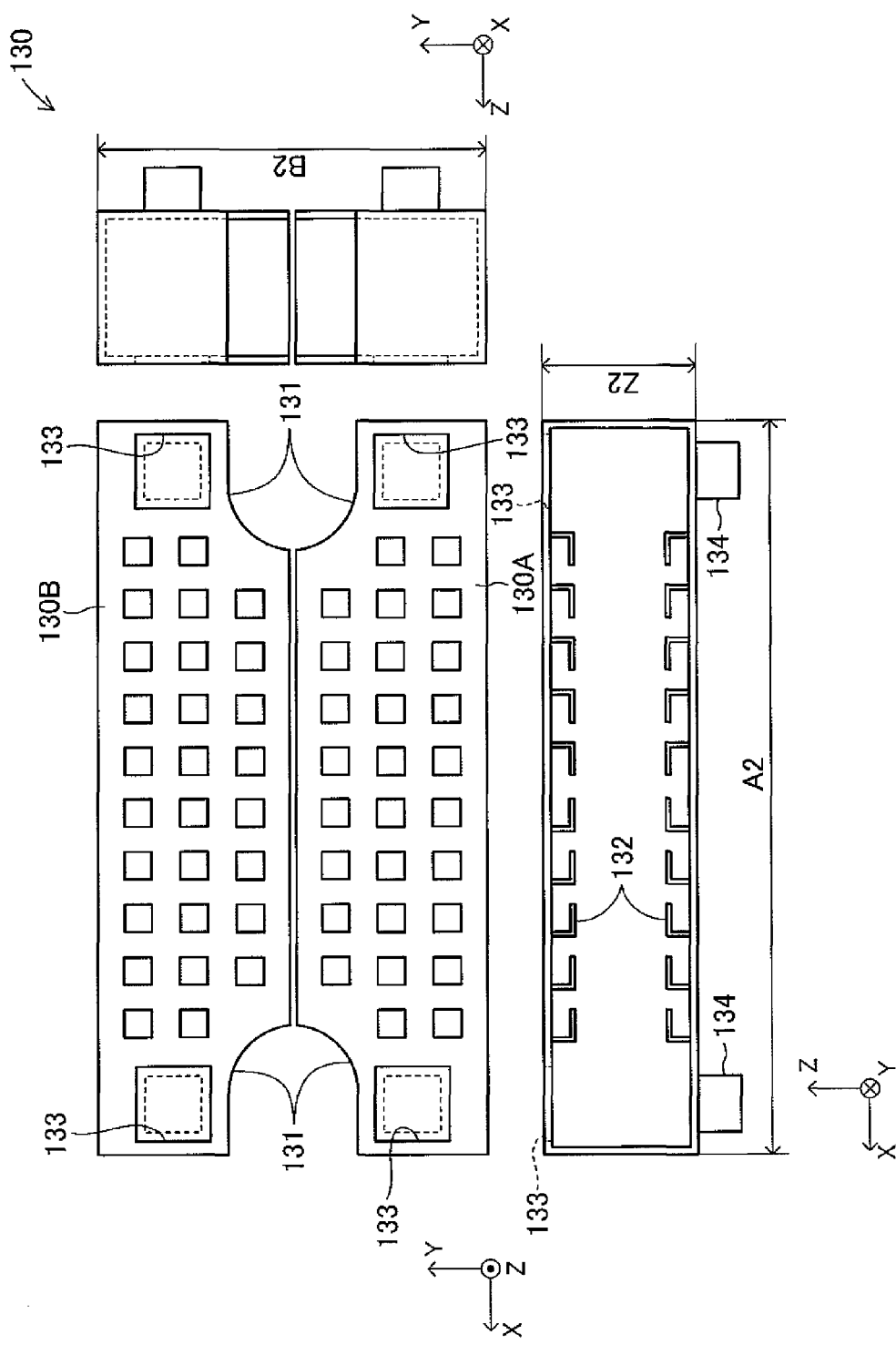
FIG. 29 is a set of views showing the interconnector 130 of FIG. 28 according to the third angle system, as viewed from the x-, y-, and z-axis directions, respectively.
Figure 30:
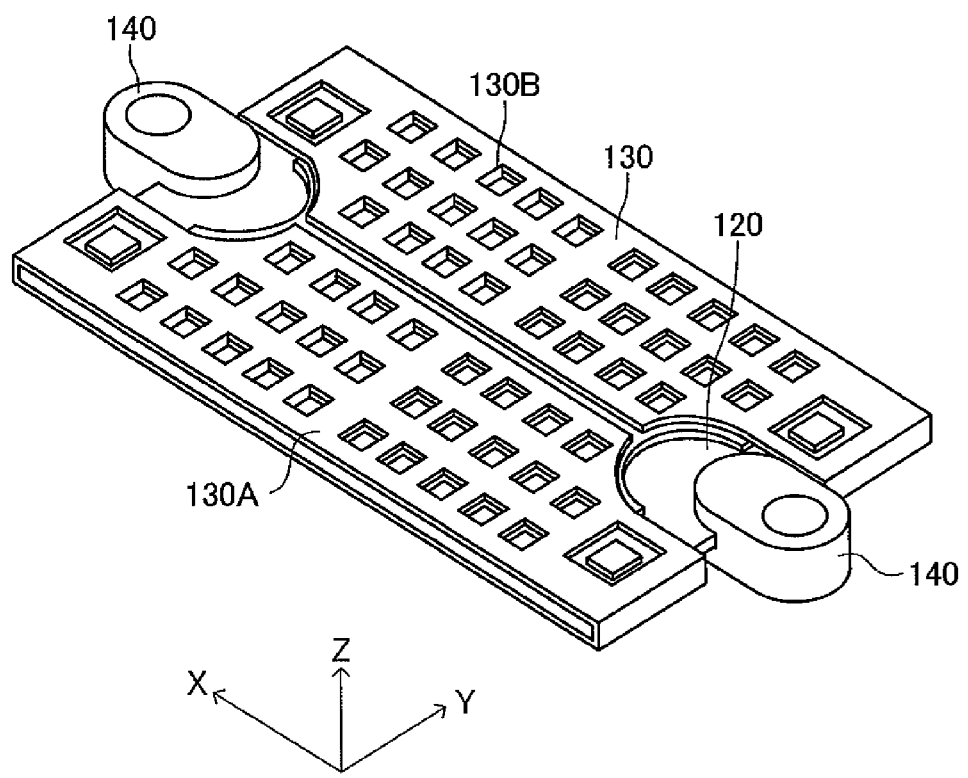
FIG. 30 is a perspective view showing a state in which the interconnector 130 is attached to the cell 120 shown in FIG. 24.

As shown in FIGS. 19 and 27, a portion of an outer peripheral portion of the cell 120 which corresponds to the inflow port 125a (or the outflow port 125b) is held between the paired protrusions 142 of the retainer piece 140 via a seal material 151. Thus, the inflow port 125a (or the outflow port 125b) is hermetically sealed, and the inflow port 125a (or the outflow port 125b) communicates with the communication hole 145 of the retainer piece 140. That is, the inflow port 125a (or the outflow port 125b) communicates with the through-hole 143 of the retainer piece 140.

As shown in FIG. 27, in the present embodiment, the ratio (H2−H1)/L is set to 0.001 to 0.5, where L is the protruding length of the paired protrusions 142 protruding from the body portion 141, H1 is the thickness of the outer peripheral portion of the cell 120, and H2 is the distance between the paired retaining surfaces 142a. Through employment of the ratio, a portion of each of the cells 120 to be held is reliably held between the paired protrusions 142 of the retainer piece 140, and the portion of the cell 120 can move freely to a certain extent in relation to the paired protrusions 142.

Preferably, the retainer piece 140 is formed from material which differs from the cell 120 in thermal expansion coefficient by $2\times10^{-6}$/K or less. Examples of such material include zirconia, magnesia, and spinel ceramics. Also, the retainer piece 140 may be formed from nickel; a nickel-based alloy, such as INCONEL or NICHROME; an iron-based alloy, such as stainless steel; or a cobalt-based alloy, such as STELLITE.

No particular limitation is imposed on material for the seal material 151, so long as the material has the function of hermetically sealing the inflow port 125a (or the outflow port 125b). Preferably, the seal material 151 is of glass having a softening point (400° C. to 700° C.) lower than an operating temperature (600° C. to 900° C.) of the solid oxide fuel cell apparatus 100. Through employment of the seal material 151 of such glass, the seal material 151 can be softened during operation of the solid oxide fuel cell apparatus. As a result, while the seal material 151 maintains its sealing function, a portion of the cell 120 to be held can reliably move in relation to the retainer piece 140. Accordingly, for example, in the case where the amount of deformation of the cell 120 varies with rising temperature, various stresses which the cell 120 receives from the retainer piece 140 can be mitigated.

Next, the interconnector 130 will be described with reference to FIGS. 17 to 19 and 28 to 30. In the present embodiment, the interconnector 130 is divided into a first portion 130A and a second portion 130B, which are symmetrical to each other with respect to the x-z plane located at the center along the y-axis direction. Hereinafter, for convenience of explanation, the interconnector 130 may be handled as a single unit composed of the first and second portions 130A and 130B.

The interconnector 130 is a frame (casing) formed from an electric conductor and roughly assumes the form of a rectangular parallelepiped having sides along the x-, y-, and z-axes (a thin plate whose thickness direction is along the z-axis). In the present embodiment, the length A2 of the side (long side) along the x-axis is 40 mm to 310 mm; the length B2 of the side (short side) along the y-axis is 25 mm to 160 mm; and the thickness Z2 is 3 mm to 8 mm (see FIG. 29).

In the present embodiment, the interconnector 130 is formed from ZMG material (product of Hitachi Metals, Ltd.), which is ferritic stainless steel for use in a fuel cell. The interconnector 130 has an average thermal expansion coefficient over a range of room temperature to 1,000° C. of about 12.5 ppm/K. Thus, the interconnector 130 has substantially the same thermal expansion coefficient as that of the cell 120. As a result, even when the temperature of the fuel cell apparatus 100 varies, the difference in the amount of expansion and contraction is unlikely to arise between the cell 120 and the interconnector 130.

The interconnector 130 (i.e., frame) has an internal space which opens in the y-axis directions (which extends therethrough), for receiving the cell 120. The interconnector 130 has a pair of the cutouts 131 in order to avoid interference with a pair of retainer pieces 140 attached to the cell 120 received therein.

The upper and lower surfaces of the frame of the interconnector 130 have a plurality of protrusions 132 protruding downward and upward from edges of small windows (through-holes) formed therein. As will be described later, the protrusions 132 function as electrical connectors for electrical connection to the air electrode layers 123 of the cell 120 received in the interconnector 130.

The upper surface of the frame of the interconnector 130 has windows 133 (through-holes) formed therein at its four corner positions on the x-y plane corresponding to the positions of the aforementioned conductive plates 126 of the cell 120 received in the interconnector 130. The lower surface of the frame of the interconnector 130 has leg portions 134 projecting downward and formed at its four corner positions on the x-y plane corresponding to the positions of the windows 133. As viewed from the z-axis direction, the entire leg portions 134 are contained within the respective windows 133. As will be described later, in the aforementioned stacked state, the leg portions 134 function as electrical connectors for electrical connection to the respective conductive plates 126 of the cell 120 received in the lower adjacent interconnector 130.

The fuel cell apparatus 100 has a stack structure in which a plurality of the cells 120 are stacked through stacking of pairs of the retainer pieces 140 attached to the cells 120. That is, the cells 120 are stacked such that two adjacent ones of the cells 120 are spaced apart from each other in the z-axis direction by a distance equivalent to two times the thickness of the protrusion 142 of the retainer piece 140 (see, particularly, FIG. 19).

Additionally, as shown in FIG. 19, the through-holes 143 of a plurality of the stacked retainer pieces 140 are connected to one another in the z-axis direction, thereby forming a single fuel supply channel 143a extending in the z-axis direction and connected to the inflow ports 125a of the cells 120, and a single fuel discharge channel 143b extending in the z-axis direction and connected to the outflow ports 125b of the cells 120. The fuel supply channel 143a and the fuel discharge channel 143b communicate with each other via the inner flow channels 124 formed within the cells 120. The fuel supply channel 143a and the fuel discharge channel 143b are located externally of the cell 120 as viewed from the z-axis direction. A stack of the retainer pieces 140 in which the fuel supply channel 143a is formed, and a stack of the retainer pieces 140 in which the fuel discharge channel 143b is formed, correspond to the aforementioned "retainer member."

No particular limitation is imposed on seal material used to connect the adjacent retainer pieces 140, so long as the seal material has the function of hermetically sealing the adjacent retainer pieces 140 against each other. Preferably, the seal material is formed from glass having a softening point (600° C. to 900° C.) higher than that of the seal material 151, or from ceramic (specifically, a crystalline material, such as crystallized glass or glass-ceramics, or a material which mixedly contains amorphous and crystalline substances). Through employment of such a seal material, in the course of operation of the solid oxide fuel cell apparatus 100, the seal material is unlikely to be softened. As a result, while the seal material preserves its sealing function, the entire shape of the stack structure can be reliably maintained.

The paired air electrode layers 123 of each of the cells 120 and a plurality of the protrusions 132 of the interconnector 130 which accommodates the cell 120 are electrically connected and fixed together by means of an electrically conductive seal material 152 (conductive paste) (see, particularly, FIG. 18). Also, the four windows 133 of a certain interconnector 130 receive the four respective leg portions 134 of the upper adjacent interconnector 130 located above the certain interconnector 130. Additionally, the conductive plates 126 (upper surfaces thereof) of a certain cell 120 and the leg portions 134 (bottom surfaces thereof) of the upper adjacent interconnector 130 located above the interconnector 130 which accommodates the certain cell 120 are electrically connected and fixed together by means of an electrically conductive seal material 153 (conductive paste) (see, particularly, FIG. 18).

Thus, the air electrode layer 123 of the upper cell 120 of two adjacent cells 120 and the fuel electrode layer 121 of the lower cell 120 of the two adjacent cells are electrically connected to each other via the interconnector 130 which accommodates the upper cell 120. That is, in the entire fuel cell apparatus 100, a plurality of the cells 120 are electrically connected in series.

Also, a space formed between two adjacent ones of the cells 120 is used as an air flow channel S in which oxygen-containing gas (e.g., air) flows. As mentioned above, the electrolyte layer 122 of the cell 120 covers the entire fuel electrode layer 121. Accordingly, the air flow channel S and the inner flow channel 124 are separated only by the electrolyte layer 122.

Figure 31:
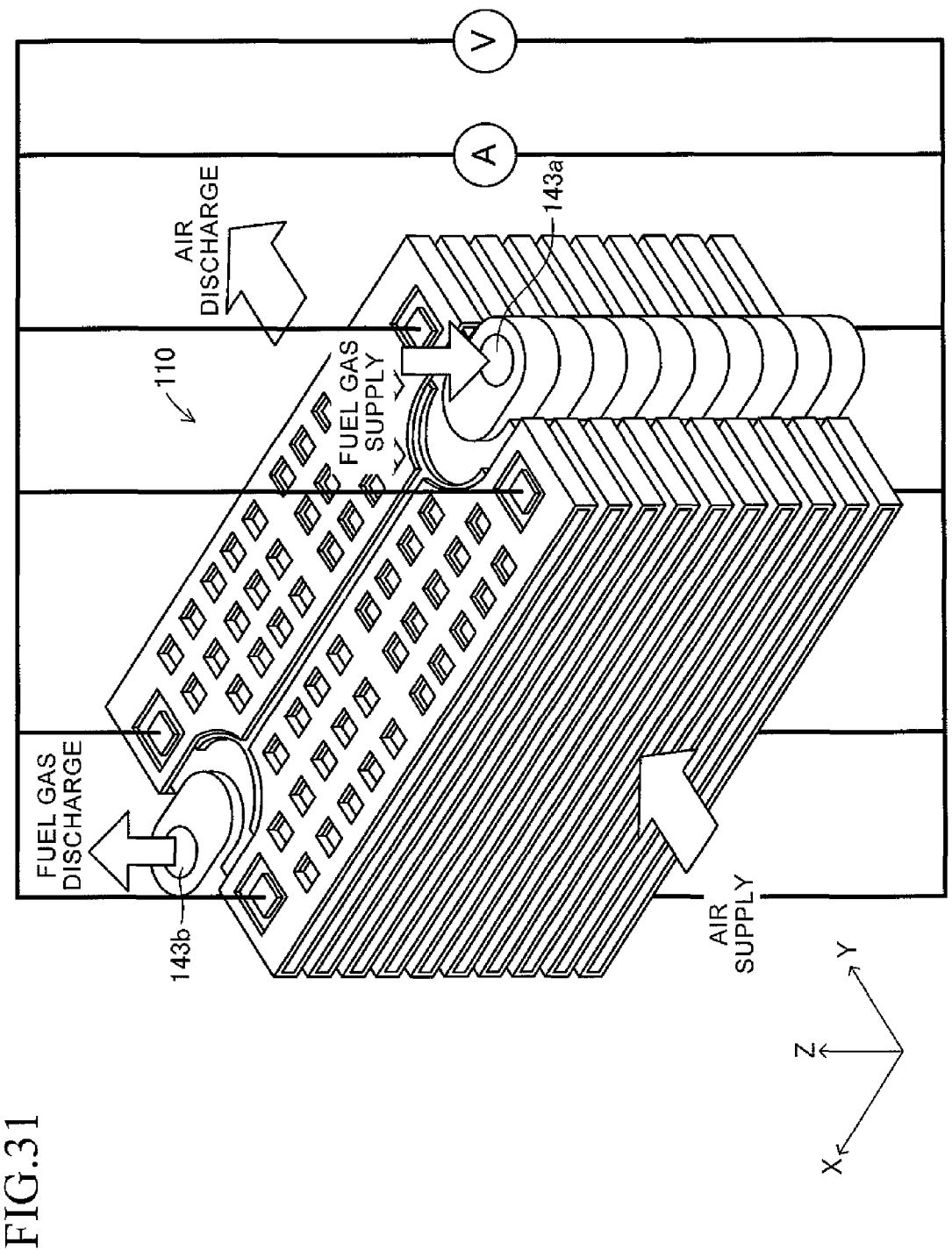
FIG. 31 is an explanatory view for explaining the flow of fuel gas and air in the fuel cell apparatus 100 shown in FIG. 16.
Figure 32:
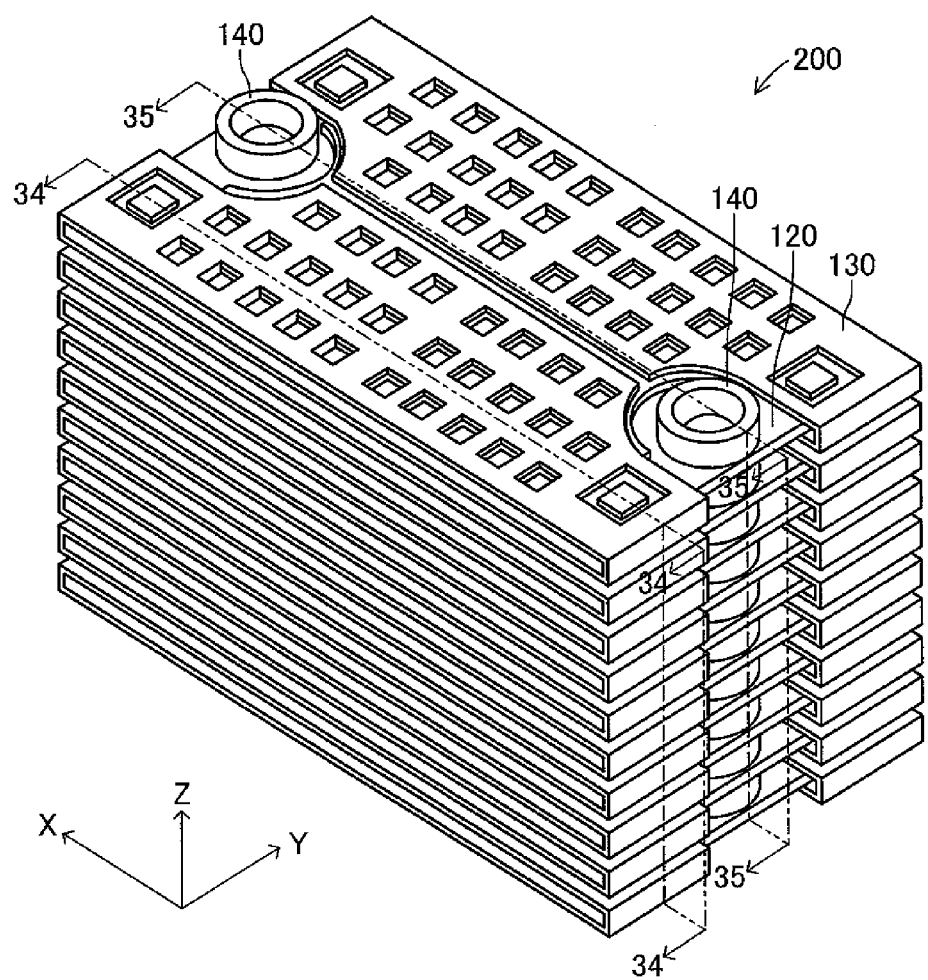
FIG. 32 is a perspective view showing a solid oxide fuel cell apparatus 200 according to a comparative example.
Figure 33:
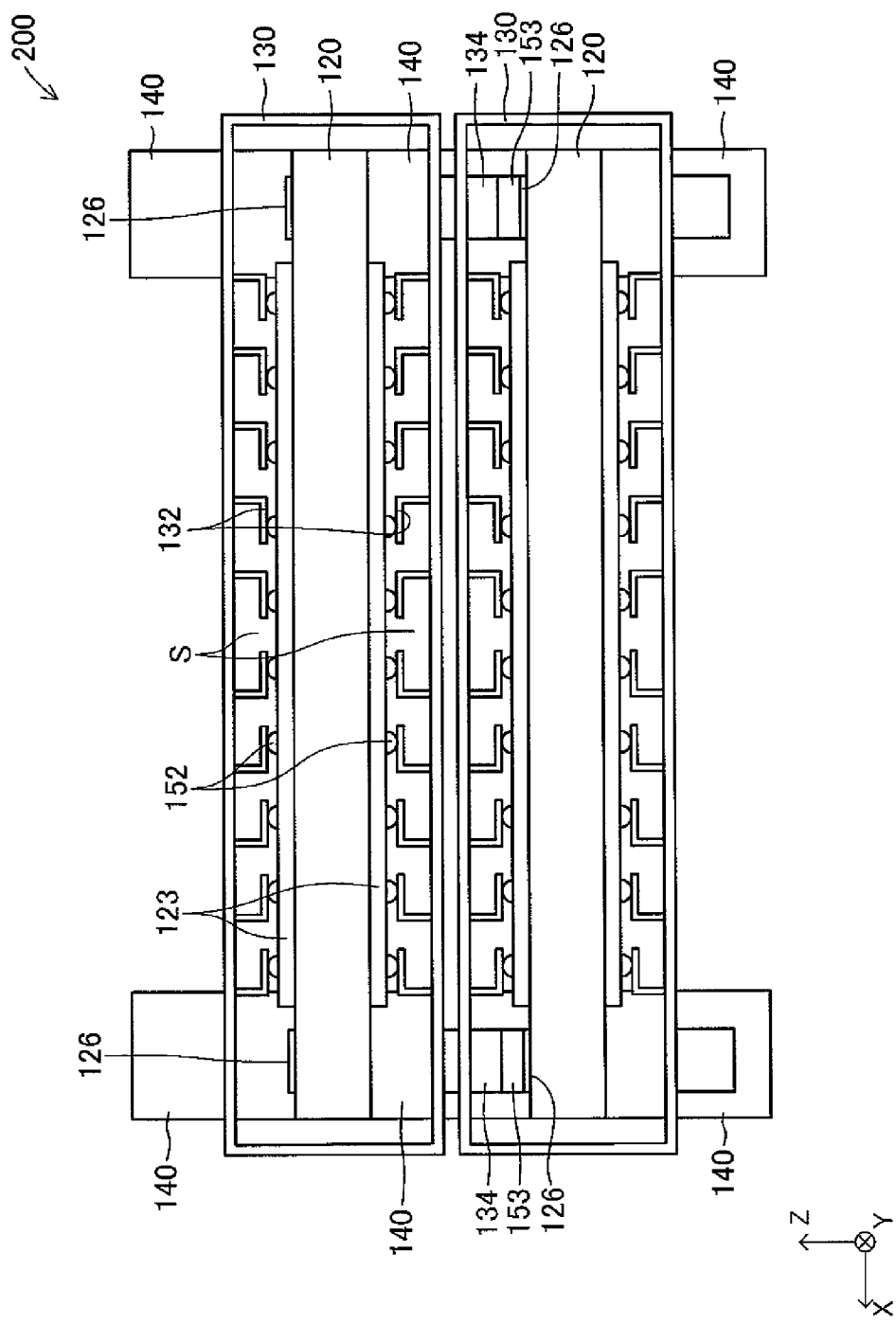
FIG. 33 is a partial view of the fuel cell apparatus 200 as viewed from the direction of the y-axis in FIG. 32.

As shown in FIG. 31, the thus-configured fuel cell apparatus 100 is supplied with air from the y-axis direction and fuel gas from the fuel supply channel 143a. The supplied air flows through the air flow channels S and comes into contact with pairs of the air electrode layers 123 of the individual cells 120. Meanwhile, the supplied fuel gas flows in the inner flow channels 124 formed in the cells 120 and is discharged from the fuel discharge channel 143b (see the arrows in FIG. 19). In this manner, the fuel gas is supplied to the inner flow channels 124, and air is supplied to the air flow channels S, whereby the fuel cell apparatus 100 generates electricity according to the following chemical formulas (1) and (2).

$$(1/2).O_2+2e^- \rightarrow O^{2-} \text{ (at air electrode layers 123)} \quad (1)$$

$$H_2+O^{2-} \rightarrow H_2O+2e^- \text{ (at fuel electrode layers 121)} \quad (2)$$

Since the solid oxide fuel cell (SOFC) apparatus 100 generates electricity through utilization of oxygen conductivity of the electrolyte layers 122, the operating temperature of the fuel cell apparatus 100 is generally 600° C. or higher. Thus, in operation of the fuel cell apparatus 100, the fuel cell apparatus 100 is raised in temperature from room temperature to an operating temperature (e.g., 800° C.) by means of an external heating mechanism (e.g., a heating mechanism of a resistance heater type, or a heating mechanism which utilizes heat generated through combustion of fuel gas).

According to the stack structure of the solid oxide fuel cell apparatus 100 according to the present embodiment shown in FIGS. 16 to 31, loads of the cells 120 are borne by the retainer member, which is a stack of the retainer pieces 140, and each of the cells 120 is retained by pairs of the protrusions 142 of each pair of the retainer pieces 140. Accordingly, in a stack of a large number of the cells 120, loads of a plurality of the cells 120 located above a certain cell 120 are not cumulatively imposed on the certain cell 120. As a result, the rate of occurrence of cracking of the cell 120 lowers. Accordingly, the rate of occurrence of gas leakage stemming from warpage or deformation of the cell 120 lowers.

Particularly, in the present embodiment, warpage or deformation of the cell 120 not only arises from firing but also could arise from the contraction of the fuel electrode layer 121 within the cell 120 associated with the aforementioned reduction process (reduction-induced contraction) and the reduction-induced expansion of the conductive plate 126 formed from lanthanum chromite. That is, the cell 120 used in the present embodiment is very apt to suffer warpage or deformation. Despite the use of the cell 120 which is very apt to suffer warpage or deformation, the present embodiment can effectively lower the rate of occurrence of gas leakage stemming from warpage or deformation of the cell 120.

Since the aforementioned ratio (H2−H1)/L (see FIG. 27) is set to 0.001 to 0.5, a portion of each of the cells 120 to be held is reliably held between the paired protrusions 142 of the retainer piece 140, and the portion of the cell 120 can move freely to a certain extent in relation to the paired protrusions 142. Accordingly, even when the cell 120 is warped, the horizontality of the upper and lower surfaces of the retainer piece 140 can be ensured. Thus, the cell-to-cell distance can be determined through the thickness of the protrusion 142 of the retainer piece 140.

As a result, even when the cell(s) 120 is warped before or after fabrication of the stack structure, the cell(s) 120 can be reliably retained, and there can be restrained an increase in the rate of occurrence of gas leakage stemming from inclination of the upper and lower surfaces of the retainer piece 140 from the horizontal. Additionally, the warpage of some cells 120 is less likely to affect the entire stack, whereby variation among cell-to-cell distances can be lowered.

In the present embodiment, the retainer member is divided into a plurality of the retainer pieces 140 corresponding to the cells 120. Accordingly, the stack structure can be fabricated in such a manner that, after the retainer pieces 140 are attached to the corresponding cells 120, the resultant cells 120 to which the retainer pieces 140 are attached are stacked. As a result, before fabrication of the stack structure, the cells 120 to which the retainer pieces 140 are attached can be individually tested for leakage of gas (gas leak test). Accordingly, before fabrication of the stack structure, the cell(s) 120 which suffers gas leakage (defective cell) can be found, and the defective cell(s) 120 can be replaced beforehand with the cell(s) 120 free from gas leakage (nondefective cell(s)).

By contrast, in the case of employment of a common integral retainer member for a plurality of cells, the plurality of cells are attached to the retainer member, whereby a stack structure can be fabricated. In this case, the gas leak test cannot be conducted before fabrication of the stack structure. In other words, before fabrication of the stack structure, a defective cell(s) cannot be found; accordingly, the defective cell(s), if any, cannot be replaced with a nondefective cell(s). Thus, as compared with the case of employment of a common integral retainer member for a plurality of cells, the employment of the stack structure according to the present embodiment facilitates the execution of the gas leak test as well as the replacement of a defective cell(s), if any, with a nondefective cell(s).

In the present embodiment, the retainer piece 140 is attached to the cell 120 in such a manner as to hold only a central portion of a side surface (plane) in parallel with the y-z plane of the cell 120. Accordingly, as compared with the case where the retainer piece 140 holds the side surface over the entire length thereof, the present embodiment is smaller in the contact area between an outer peripheral portion of the cell 120 and the protrusions 142 of the retainer piece 140. As a result, the rate of occurrence of gas leakage stemming from the warpage or deformation of the cell 120 is lowered.

The present invention is not limited to the above-described embodiment, but may be modified in various other forms without departing from the scope of the invention. For example, in the above-described embodiment, the paired retainer pieces 140 are attached to the cell 120 in such a manner as to cover the inflow port 125a and the outflow port 125b. That is, there is achieved a both-end-support structure in which a pair of the retainer pieces 140 supports each of the cells 120. By contrast, there may be employed a structure in which the retainer piece 140 is attached to the cell 120 in such a manner as to cover the inflow port 125a, whereas the outflow port 125b of the cell 120 is open to the exterior of the cell 120 (i.e. a cantilever structure in which the cell 120 is held by a single retainer piece 140).

According to the above-described embodiment, in the cell 120, the electrolyte layer 122 is formed in such a manner as to cover the entire surface (upper and lower surfaces and side surface) of the fuel electrode layer 121. However, the electrolyte layer may be formed only on the upper and lower surfaces of the fuel electrode layer 121 and may not be formed on the side surface (four surfaces) of the fuel electrode layer 121. In this case, in order to separate the air flow channel S and the fuel flow channel 124 from each other, the side surface of the fuel electrode layer 121 (or the entire side surface of the cell 120) must be covered with, in place of the electrolyte layer, a side wall having the function of separating the air flow channel S and the fuel flow channel 124 from each other. In this case, the side wall can be of, for example, a glass material.

The above-described embodiment (see FIGS. 16 to 31) is low in the rate of occurrence of gas leakage stemming from, for example, the cracking, warpage, or deformation of the cell 120. In order to verify this feature, a gas leak test was conducted. This test employed, as a Comparative Example, the stack structure shown in FIGS. 32 to 38. The Comparative Example differs from the above-described embodiment in that, in place of the above-mentioned pair of the retainer pieces 140, a pair of ring-shaped connection pieces 140 is used to hold each of the cells 120 of the stack structure.

Figure 34:
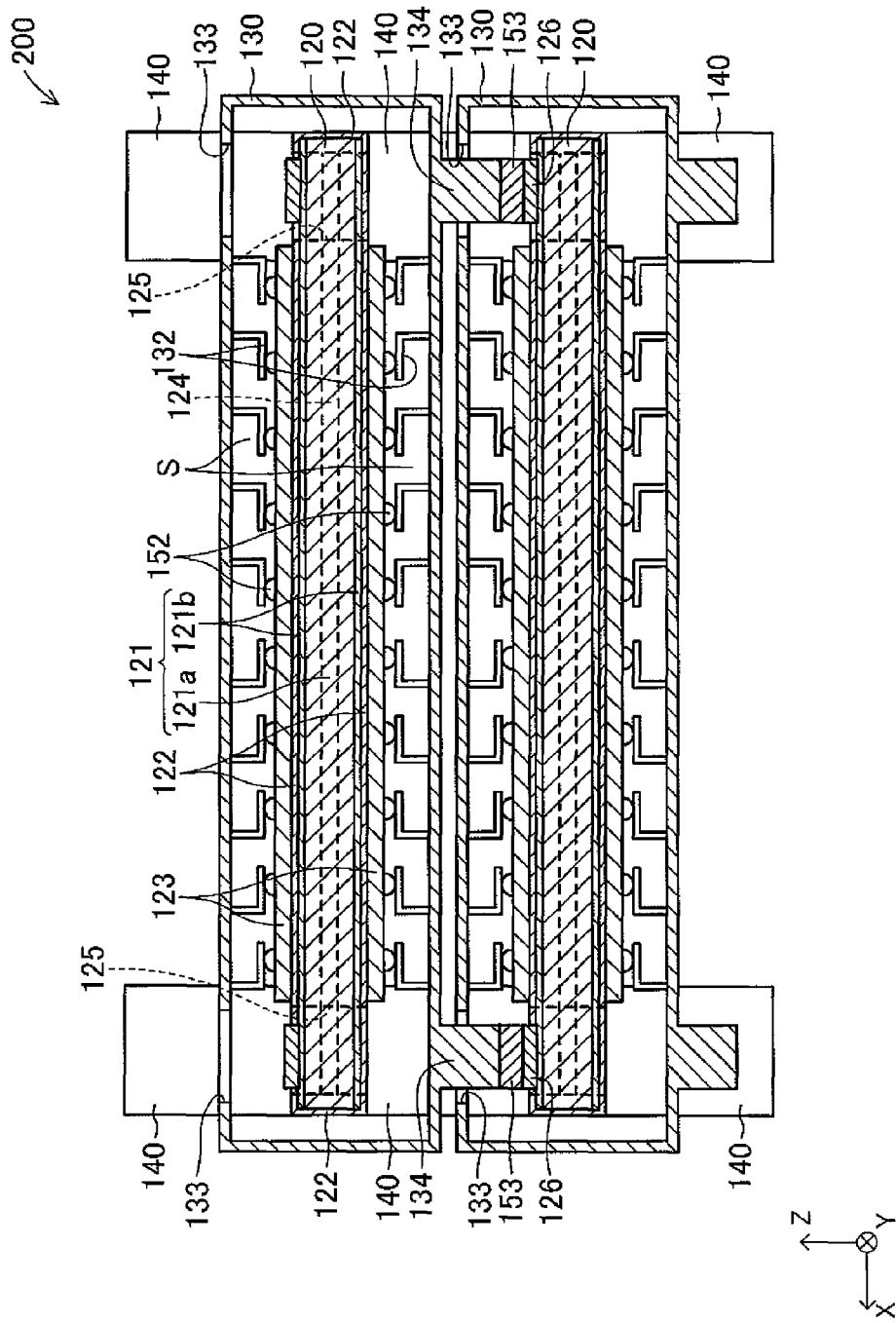
FIG. 34 is a partial, sectional view of the fuel cell apparatus 200 as cut along an x-z plane which contains line 34-34 of FIG. 32.
Figure 35:
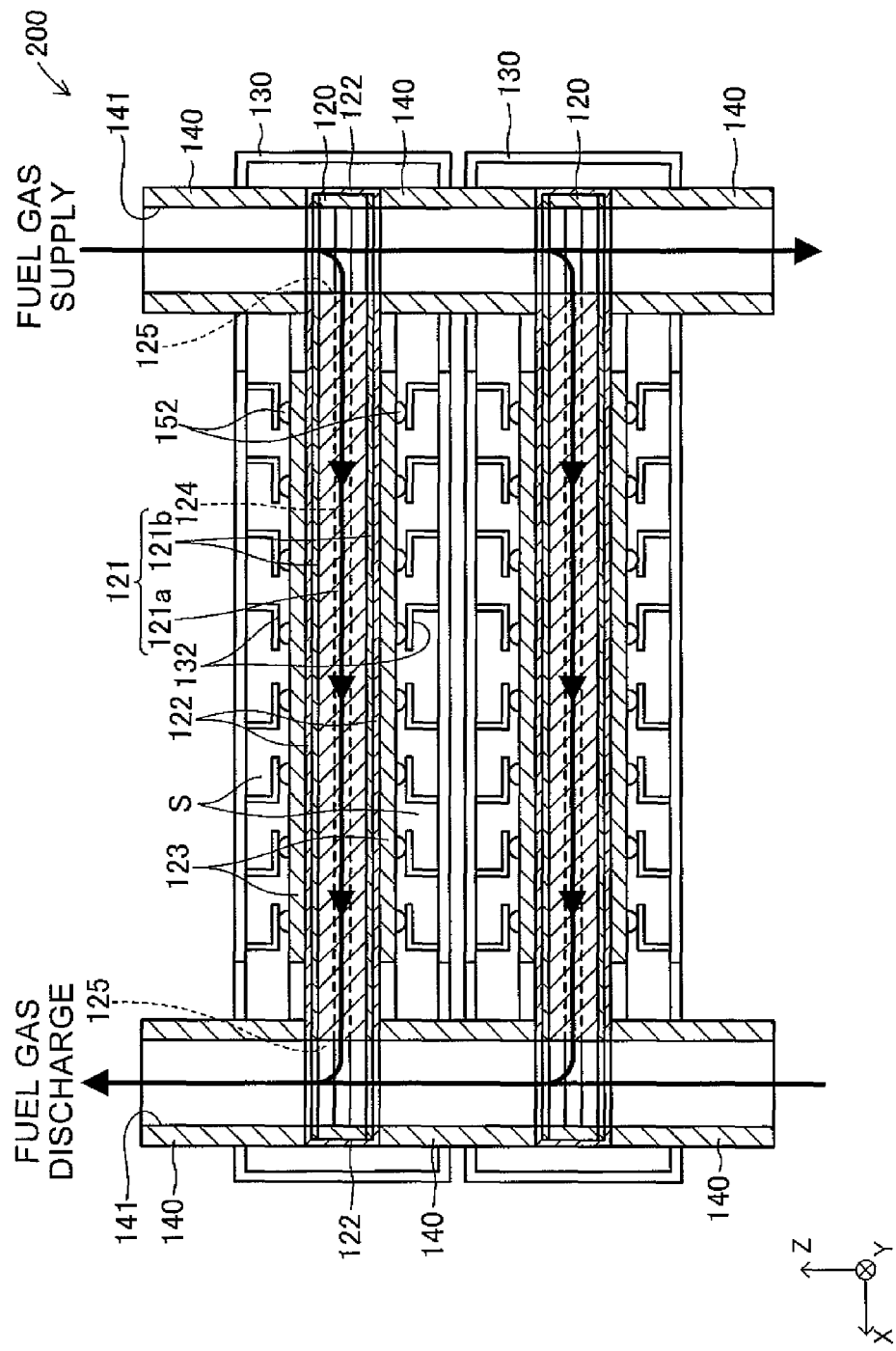
FIG. 35 is a partial, sectional view of the fuel cell apparatus 200 as cut along an x-z plane which contains line 35-35 of FIG. 32.
Figure 36:
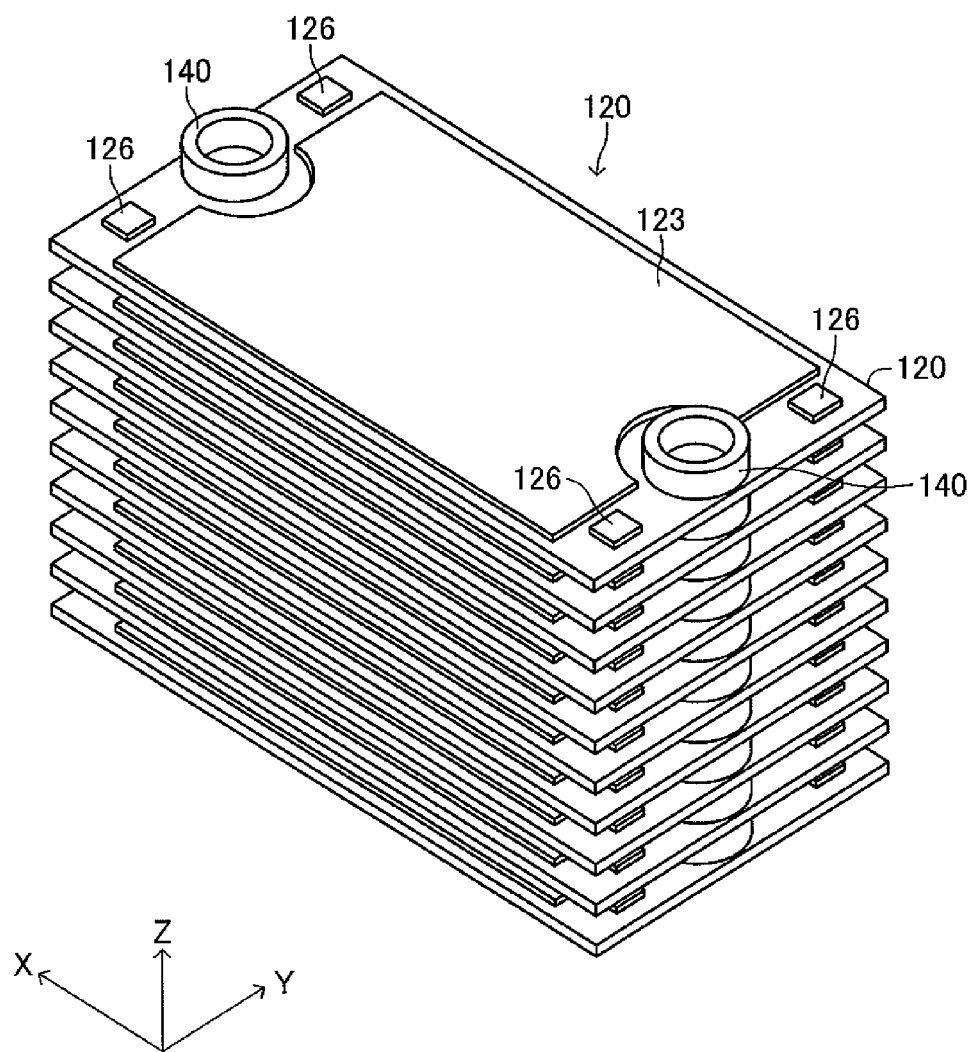
FIG. 36 is a perspective view of the fuel cell apparatus 200 of FIG. 32, showing a state before attachment of the interconnectors 130.
Figure 37:
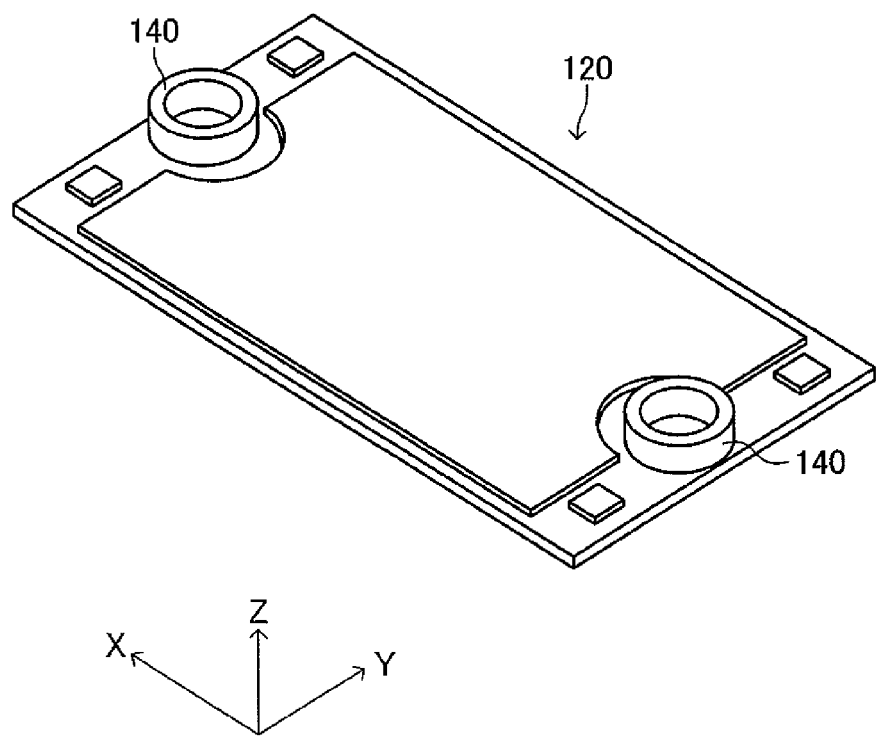
FIG. 37 is a perspective view showing a state in which connection pieces 140 are attached to the cell 120 shown in FIG. 32 at positions corresponding to through-holes 125 of the cell 120.
Figure 38:
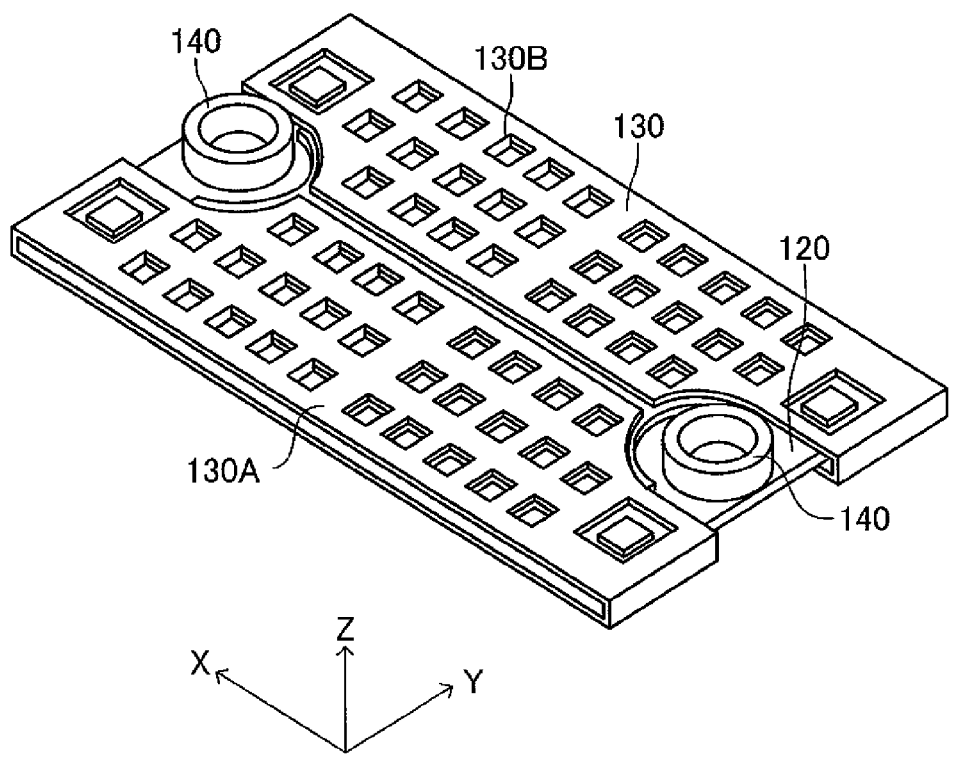
FIG. 38 is a perspective view showing a state in which the interconnector 130 is attached to the cell 120 shown in FIG. 37.

The paired connection pieces 140 are mounted on the upper surface of each of the cells 120 at respective positions corresponding to paired through-holes 125 (see FIGS. 34, 35, and 37). The paired through-holes 125 of each of the cells 120 are connected to the inner flow channel 124 (see FIGS. 34 and 35). The cells 120 to each of which the paired connection pieces 140 are attached (see FIG. 37) are stacked, thereby fabricating the stack structure (see FIG. 36). As a result, as shown in FIG. 35, the through-holes 125 of the cells 120 and the through-holes of the connection pieces 140 are alternatingly connected to one another, thereby forming a single fuel supply channel extending in the z-axis direction and a single fuel discharge channel extending in the z-axis direction. The fuel supply channel and the fuel discharge channel communicate with each other via the inner flow channels 124 formed in the cells 120.

In this gas leak test, 10 test samples corresponding to the above-described embodiment (see FIGS. 16 to 31) and 10 test samples corresponding to the above-described Comparative Example (see FIGS. 32 to 38) were fabricated. The method of fabricating these test samples is similar to that described above in the "EXAMPLE" Section; thus, the redundant description thereof is omitted. The cells of the test samples each measure 100 mm×50 mm×2.0 mm (dimensions A1×B1×Z1 in FIG. 22).

The method of the gas leak test is similar to that described above in the "Evaluation of antileak performance during generation of electricity" Section; thus, the redundant description thereof is omitted. In this gas leak test, the antileak performance was evaluated on the basis of gas recovery percentage defined by the following expression. Table 2 shows the result of evaluation.

Gas recovery percentage=(recovered gas flow rate)/(charged gas flow rate)

TABLE 2

| | Gas recover percentage [%] |
|---|---|
| Embodiment | 100 |
| Comparative Example | 94 |

As shown in Table 2, as compared with the above-described Comparative Example, the above-described embodiment exhibits a far higher gas recovery percentage. That is, as compared with the Comparative Example, the embodiment is very low in the rate of occurrence of gas leakage.

Figure 39:
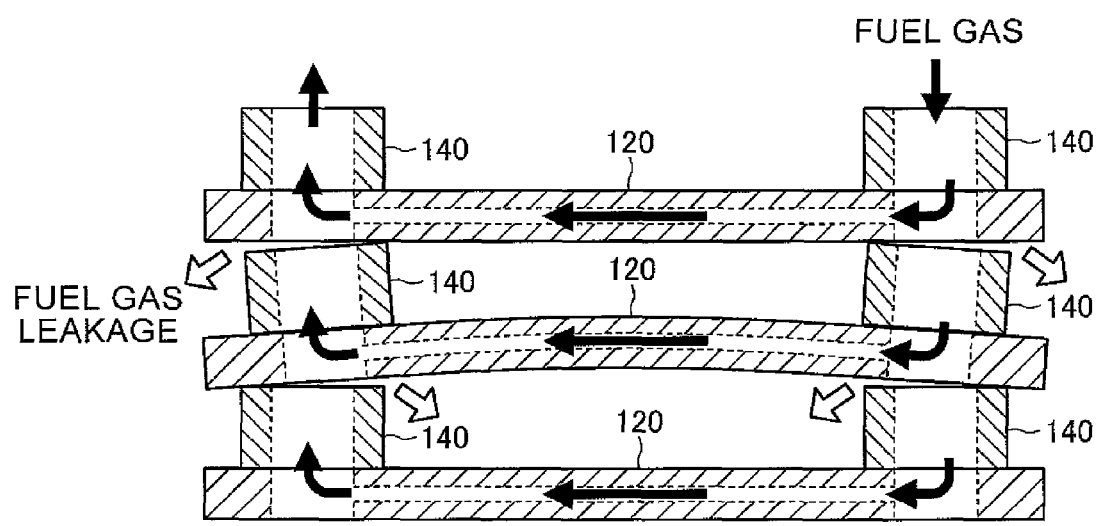
FIG. 39 is a schematic view showing a state of the stack structure according to the comparative example in which the cell 120 is warped.
Figure 40:
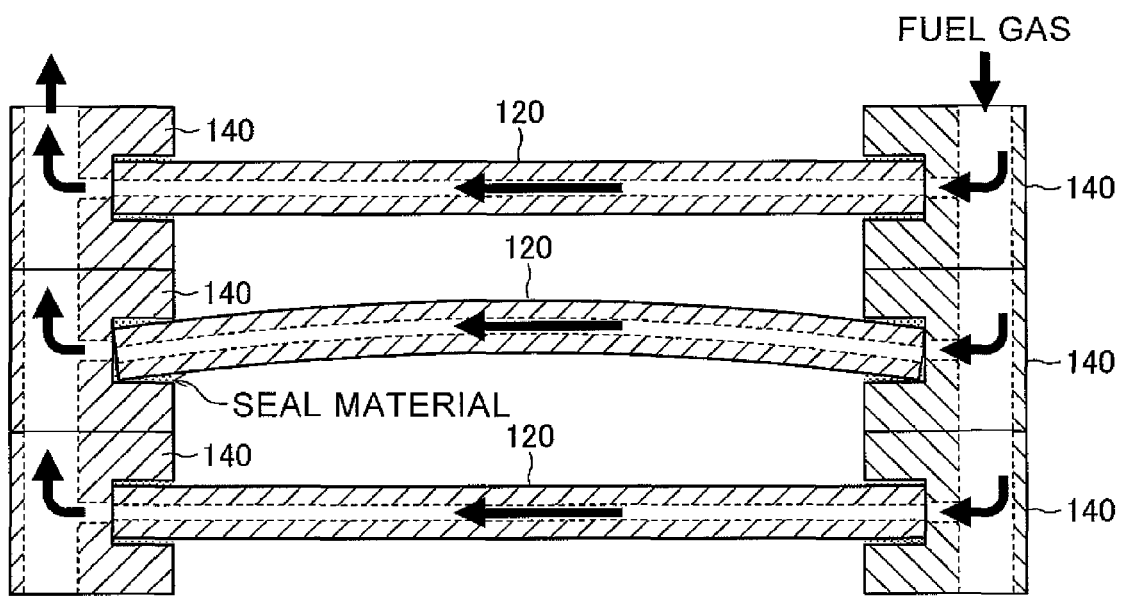
FIG. 40 is a schematic view showing a state of the stack structure according to the embodiment of the present invention in which the cell 120 is warped.

The above difference in antileak performance will be analyzed with reference to FIGS. 39 and 40. FIG. 39 shows the flow of fuel gas represented by the black arrows and gas leakage represented by the white arrows in the case where a certain cell 120 is warped in the stack structure of the Comparative Example.

As shown in FIG. 39, when a certain cell 120 is warped, the connection pieces 140 attached to the certain cell 120 are inclined from the horizontal. As a result, a gap is formed between the upper surface of each of the inclined connection pieces 140 and the lower surface (the horizontal) of the cell 120 overlying the inclined connection pieces 140; thus, gas could leak through the gaps (see the white arrows). Similarly, when the certain cell 120 is warped, the lower surface thereof is inclined from the horizontal. As a result, a gap is formed between the lower surface of the certain cell 120 and the upper surface (the horizontal) of each of the connection pieces 140 underlying the certain cell 120; thus, gas could leak through the gaps (see the white arrows). In this manner, the Comparative Example is relatively likely to suffer gas leakage in the case of occurrence of warpage of the cell 120.

By contrast, FIG. 40 shows the flow of fuel gas represented by the black arrows in the case where a certain cell 120 is warped in the stack structure of the above-described embodiment. As shown in FIG. 40, in the embodiment, even when the certain cell 120 is warped, the retainer pieces 140 which hold the certain cell 120 can be maintained horizontally. Accordingly, a gap as in the case of the Comparative Example (see FIG. 39) is unlikely to be formed. Therefore, the embodiment can be said to be very unlikely to suffer gas leakage even when the cell 120 is warped.

What is claimed is:

1. A stack structure of a solid oxide fuel cell apparatus comprising:
    a plurality of solid oxide fuel cells each in the form of a plate, having a pair of upper and lower main surfaces, and a side surface, and comprising a fuel-side electrode having an inner flow channel for fuel gas formed therein and being in contact with the fuel gas, a solid electrolyte, and an oxygen-side electrode being in contact with oxygen-containing gas and
    a retainer member adapted to retain the plurality of cells in such a manner that two adjacent ones of the cells are vertically spaced apart from each other, and having a fuel supply channel for externally supplying the fuel gas to the inner flow channels of the cells,
    spaces each formed between two adjacent ones of the cells serving as flow channels for the oxygen-containing gas,
    wherein the side surface of each of the cells has an inflow port into which the fuel gas flows from the fuel supply channel, and an outflow port from which the fuel gas flows out;
    the retainer member comprises a plurality of retainer pieces for retaining the respective cells;
    each of the retainer pieces comprises a body portion having a through-hole extending vertically therethrough and a pair of protrusions protruding horizontally from the body portion and facing each other while being spaced vertically apart from each other, and has a communication hole formed therein for establishing communication between the through-hole and a space formed between the paired protrusions; and
    a portion of an outer peripheral portion of each of the cells which corresponds to the inflow port is held between the paired protrusions of the retainer piece via a seal material, thereby isolating the inflow port from the outside of the stack structure and establishing communication between the inflow port and the communication hole, the plurality of retainer pieces are vertically stacked, thereby vertically establishing communication among a plurality of the through-holes and thus forming the fuel supply channel extending vertically, and the fuel supply channel is located externally of the cells as viewed from a vertical direction.

2. A stack structure of a solid oxide fuel cell apparatus according to claim 1, wherein a ratio (H2−H1)/L of a value (H2−H1) obtained by subtracting a thickness H1 of the outer peripheral portion of the cell from a distance H2 between the paired protrusions spaced vertically apart from each other to a protruding length L of the paired protrusions protruding horizontally from the body portion is 0.001 to 0.5 inclusive.

3. A stack structure of a solid oxide fuel cell apparatus according to claim 1, wherein an outline of each of the cells as viewed from a vertical direction has a first straight-line portion, and each of the retainer pieces is configured to hold a portion of the outer peripheral portion of each of the cells which corresponds partially to the first straight-line portion and corresponds to the inflow port.

4. A stack structure of a solid oxide fuel cell apparatus according to claim 3, wherein:
    the outline of each of the cells as viewed from a vertical direction has a second straight-line portion in parallel with the first straight-line portion, and
    a portion of the outer peripheral portion of each of the cells which corresponds partially to the second straight-line portion and corresponds to the outflow port is held between the paired protrusions of the retainer piece via the seal material, thereby isolating the outflow port from the outside of the stack structure and establishing communication between the outflow port and the communication hole, the plurality of retainer pieces are vertically stacked, thereby vertically establishing communication among a plurality of the through-holes and thus forming in the retainer member a fuel discharge channel extending vertically and adapted to discharge the fuel gas from the inner flow channels of the cells to the outside of the stack structure, and the fuel discharge channel is located externally of the cells as viewed from a vertical direction.

5. A stack structure of a solid oxide fuel cell apparatus according to claim 1, wherein the seal material contains glass having a first softening point lower than an operating temperature of the solid oxide fuel cell apparatus.

* * * * *